United States Patent
Choudhury et al.

(10) Patent No.: US 9,930,677 B2
(45) Date of Patent: Mar. 27, 2018

(54) PRIORITIZING MULTIPLE CHANNEL STATE INFORMATION (CSI) REPORTING WITH CARRIER AGGREGATION

(75) Inventors: Sayantan Choudhury, Vancouver, WA (US); Shohei Yamada, Camas, WA (US); Ahmad Khoshnevis, Portland, OR (US); Zhanping Yin, Vancouver, WA (US); John M. Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 821 days.

(21) Appl. No.: 12/962,515

(22) Filed: Dec. 7, 2010

(65) Prior Publication Data

US 2012/0140708 A1 Jun. 7, 2012

(51) Int. Cl.
*H04W 72/08* (2009.01)
*H04L 1/00* (2006.01)
*H04L 1/16* (2006.01)
*H04L 5/00* (2006.01)
H04W 8/22 (2009.01)
H04W 72/12 (2009.01)
H04L 1/18 (2006.01)

(52) U.S. Cl.
CPC ......... *H04W 72/082* (2013.01); *H04L 1/0026* (2013.01); *H04L 1/0027* (2013.01); *H04L 1/0029* (2013.01); *H04L 1/0031* (2013.01); *H04L 1/1671* (2013.01); *H04L 5/0057* (2013.01); *H04L 5/0064* (2013.01); *H04L 1/1812* (2013.01); *H04L 5/001* (2013.01); *H04W 8/22* (2013.01); *H04W 72/1242* (2013.01)

(58) Field of Classification Search
CPC ... H04L 1/1854; H04L 1/1671; H04L 5/0053; H04L 1/0027; H04L 1/0026; H04L 5/0064; H04L 1/002; H04L 1/1887; H04L 1/1854; H04L 5/0057; H04L 1/0031; H04L 5/0058; H04L 2025/03426; H04W 72/0413; H04W 72/1268; H04W 1024/046; H04W 72/085; H04W 52/281; H04W 72/10; H04W 24/10; H04W 72/04; H04B 7/0626; H04B 7/0639; H04B 7/0632; H04B 7/063; H04B 7/0417; H04B 7/0486
USPC ............... 370/252, 241, 254, 277, 310, 338, 370/328–329, 341, 431; 455/422.1, 450, 455/509

See application file for complete search history.

(56) References Cited

U.S. PATENT DOCUMENTS 7,551,898 B2    6/2009  Gaal et al.
7,649,960 B2    1/2010  Raghavan et al.
7,656,843 B2    2/2010  Puig-Oses et al.
(Continued)

OTHER PUBLICATIONS

LG Electronics, "Periodic CSI Transmission on PUCCH," 3GPP TSG RAN WG1 #65, R1-106130, Nov. 2010.*
(Continued)

*Primary Examiner* — Wutchung Chu
(74) *Attorney, Agent, or Firm* — Austin Rapp

(57) ABSTRACT

A method for reporting uplink control information (UCI) on a user equipment (UE) is described. A collision of multiple channel state information (CSI) reports corresponding to multiple component carriers (CCs) that are scheduled to be reported in the same subframe is detected. A highest priority CSI report of the multiple CSI reports is determined using a prioritization scheme. The highest priority CSI report is transmitted.

8 Claims, 14 Drawing Sheets

(56) References Cited

U.S. PATENT DOCUMENTS

| | | | |
|---|---|---|---|
| 7,773,699 B2 | 8/2010 | Jia et al. | |
| 8,559,328 B2 | 10/2013 | Tan et al. | |
| 8,611,243 B2* | 12/2013 | Ko | H04B 7/0486 370/248 |
| 8,681,627 B2* | 3/2014 | Choudhury | H04W 24/10 370/235 |
| 8,687,555 B2* | 4/2014 | Ko | H04L 1/0026 370/328 |
| 8,811,249 B2 | 8/2014 | Seo et al. | |
| 8,817,647 B2* | 8/2014 | Liao | H04L 1/0026 370/252 |
| 8,861,461 B2* | 10/2014 | Marinier | H04B 7/0626 370/329 |
| 8,891,477 B2* | 11/2014 | Kim | H04L 5/001 370/329 |
| 8,995,373 B2* | 3/2015 | Yang | H04B 7/0626 370/329 |
| 9,060,361 B2* | 6/2015 | Nam | H04L 1/0003 |
| 2008/0101280 A1* | 5/2008 | Gholmieh et al. | 370/328 |
| 2008/0253336 A1* | 10/2008 | Parkvall | H04W 24/10 370/335 |
| 2009/0316811 A1* | 12/2009 | Maeda et al. | 375/260 |
| 2010/0098012 A1* | 4/2010 | Bala et al. | 370/329 |
| 2010/0105390 A1* | 4/2010 | Ishii | 455/436 |
| 2011/0032895 A1* | 2/2011 | Englund | H04L 1/0026 370/329 |
| 2011/0080965 A1* | 4/2011 | Liu | H04L 25/0224 375/260 |
| 2011/0081932 A1* | 4/2011 | Astely | H04L 5/001 455/509 |
| 2011/0134771 A1* | 6/2011 | Chen | H04L 1/0027 370/252 |
| 2011/0176478 A1* | 7/2011 | Inohiza | 370/315 |
| 2011/0199921 A1* | 8/2011 | Damnjanovic | H04W 52/367 370/252 |
| 2011/0205981 A1* | 8/2011 | Koo et al. | 370/329 |
| 2011/0242982 A1* | 10/2011 | Lunttila et al. | 370/241 |
| 2011/0243066 A1* | 10/2011 | Nayeb Nazar et al. | 370/328 |
| 2011/0249578 A1* | 10/2011 | Nayeb Nazar | H04L 1/0027 370/252 |
| 2011/0249584 A1* | 10/2011 | Barbieri et al. | 370/252 |
| 2011/0305161 A1* | 12/2011 | Ekpenyong et al. | 370/252 |
| 2011/0310821 A1* | 12/2011 | Kim et al. | 370/329 |
| 2011/0317652 A1* | 12/2011 | Kim | H04L 5/001 370/329 |
| 2011/0319068 A1* | 12/2011 | Kim | H04L 1/1671 455/422.1 |
| 2012/0033628 A1* | 2/2012 | Eriksson et al. | 370/329 |
| 2012/0039252 A1* | 2/2012 | Damnjanovic | H04L 1/0026 370/328 |
| 2012/0040622 A1* | 2/2012 | Ren | H04B 7/0626 455/67.11 |
| 2012/0051257 A1* | 3/2012 | Kim | H04B 7/024 370/252 |
| 2012/0063500 A1* | 3/2012 | Wang et al. | 375/224 |
| 2012/0076028 A1* | 3/2012 | Ko et al. | 370/252 |
| 2012/0092989 A1* | 4/2012 | Baldemair et al. | 370/230 |
| 2012/0099527 A1 | 4/2012 | Ishii | |
| 2012/0106437 A1* | 5/2012 | Seo et al. | 370/315 |
| 2012/0127869 A1* | 5/2012 | Yin | H04L 1/0031 370/252 |
| 2012/0201207 A1 | 8/2012 | Liu et al. | |
| 2012/0220286 A1* | 8/2012 | Chen | H04W 24/10 455/422.1 |
| 2012/0314613 A1* | 12/2012 | Zhang et al. | 370/252 |
| 2013/0044653 A1* | 2/2013 | Yang et al. | 370/280 |
| 2013/0114455 A1 | 5/2013 | Yoo et al. | |
| 2013/0114554 A1* | 5/2013 | Yang et al. | 370/329 |
| 2013/0121299 A1* | 5/2013 | Kim et al. | 370/329 |
| 2013/0128813 A1* | 5/2013 | Yang et al. | 370/328 |
| 2013/0148613 A1* | 6/2013 | Han et al. | 370/329 |
| 2013/0188591 A1* | 7/2013 | Ko et al. | 370/329 |
| 2013/0215811 A1* | 8/2013 | Takaoka et al. | 370/311 |
| 2013/0215841 A1 | 8/2013 | Sun et al. | |
| 2013/0230004 A1 | 9/2013 | Nam et al. | |
| 2013/0267222 A1 | 10/2013 | Park et al. | |
| 2013/0308607 A1* | 11/2013 | Abe et al. | 370/332 |
| 2014/0029556 A1* | 1/2014 | Hoshino et al. | 370/329 |

OTHER PUBLICATIONS

Chen et al. "Periodic CQI on PUCCH for carrier aggregation" Texas Instruments, Aug. 17, 2010.*

LG Electronics, "UL CC Selection for UCI Transmission on PUSCH," 3GPP TSG RAN WG1 Meeting #65, R1-106105, Nov. 2010.

Huawei, "Periodic CQI/PMI/RI Reporting Using PUCCH for CA," 3GPP TSG RAN WG1 Meeting #62, R1-104500, Aug. 2010.

International Search Report issued for International Patent Application No. PCT/JP2011/076593 dated Feb. 7, 2012.

Panasonic, "Periodic CQI Reporting for Carrier Aggregation," 3GPP TSG-RAN WG1 Meeting 60, R1-101258, Feb. 2010.

3GPP TS 36.213 V9.0.1, "Evolved Universal Terrestrial Radio Access (E-UTRA) Physical layer procedures (Release 9)," Dec. 2009.

Qualcomm Incorporated, "UCI Transmission for CA," 3GPP TSG RAN WG1 #62bis, R1-105563, Oct. 2010.

InterDigital Communications, LLC, "PUSCH Selection for Transmission of UCI," 3GPP TSG-RAN WG1 Meeting #62bis, R1-105277, Oct. 2010.

Media Tek Inc., "Remaining Issues of PUSCH Selection for UCI in Carrier Aggregation," 3GPP TSG-RAN WG1 Meeting #62bis, R1-105235, Oct. 2010.

HTC, "UCI on Simultaneous PUCCH/PUSCH Transmission," 3GPP TSG-RAN WG1 #62bis, R1-105516, Oct. 2010.

LG Electronics, "UCI Transmission for Simultaneous PUCCH/PUSCH," 3GPP TSG RAN WG1 Meeting #63, R1-106104, Nov. 2010.

International Search Report issued for International Patent Application No. PCT/JP2011/078836 dated Jan. 17, 2012.

International Search Report issued for International Patent Application No. PCT/JP2011/076596 dated Feb. 7, 2012.

Nokia Siemens Networks, Nokia, "Periodic CSI Reporting for Carrier Aggregation," 3GPP TSG RAN WG1 Meeting #63, R1-106194, Nov. 2010.

Huawei, HiSilicon, "Periodic CQI/PMI/RI Reporting for CA," 3GPP TSG RAN WG1 Meeintg #62bis, R1-105122, Oct. 2010.

3GPP TS 36.213 V8.6.0, "Evolved Universal Terrestrial Radio Access (E-UTRA) Physical layer procedures (Release 8)," Mar. 2009.

Ericsson, ST-Ericsson, "Periodic CSI Reporting for CA," 3GPP TSG RAN WG1 Meeting #62bis, R1-105314, Oct. 2010.

Office Action issued for U.S. Appl. No. 13/026,090 dated Jul. 23, 2013.

Notice of Allowance issued for U.S. Appl. No. 13/026,090 dated Nov. 4, 2013.

Office Action issued for U.S. Appl. No. 14/171,506 dated Oct. 20, 2014.

* cited by examiner

US 9,930,677 B2

PRIORITIZING MULTIPLE CHANNEL STATE INFORMATION (CSI) REPORTING WITH CARRIER AGGREGATION

TECHNICAL FIELD

The present invention relates generally to wireless communications and wireless communications-related technology. More specifically, the present invention relates to systems and methods for prioritizing multiple channel state information (CSI) reporting with carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. In Rel-10, multiple component carriers (CCs) or cells were introduced. The use of multiple component carriers (CCs) or cells may increase the amount of uplink control information (UCI) generated by a wireless communication device. Benefits may be realized by improved methods for reporting uplink control information (UCI) by a wireless communication device.

DETAILED DESCRIPTION

Figure 1:
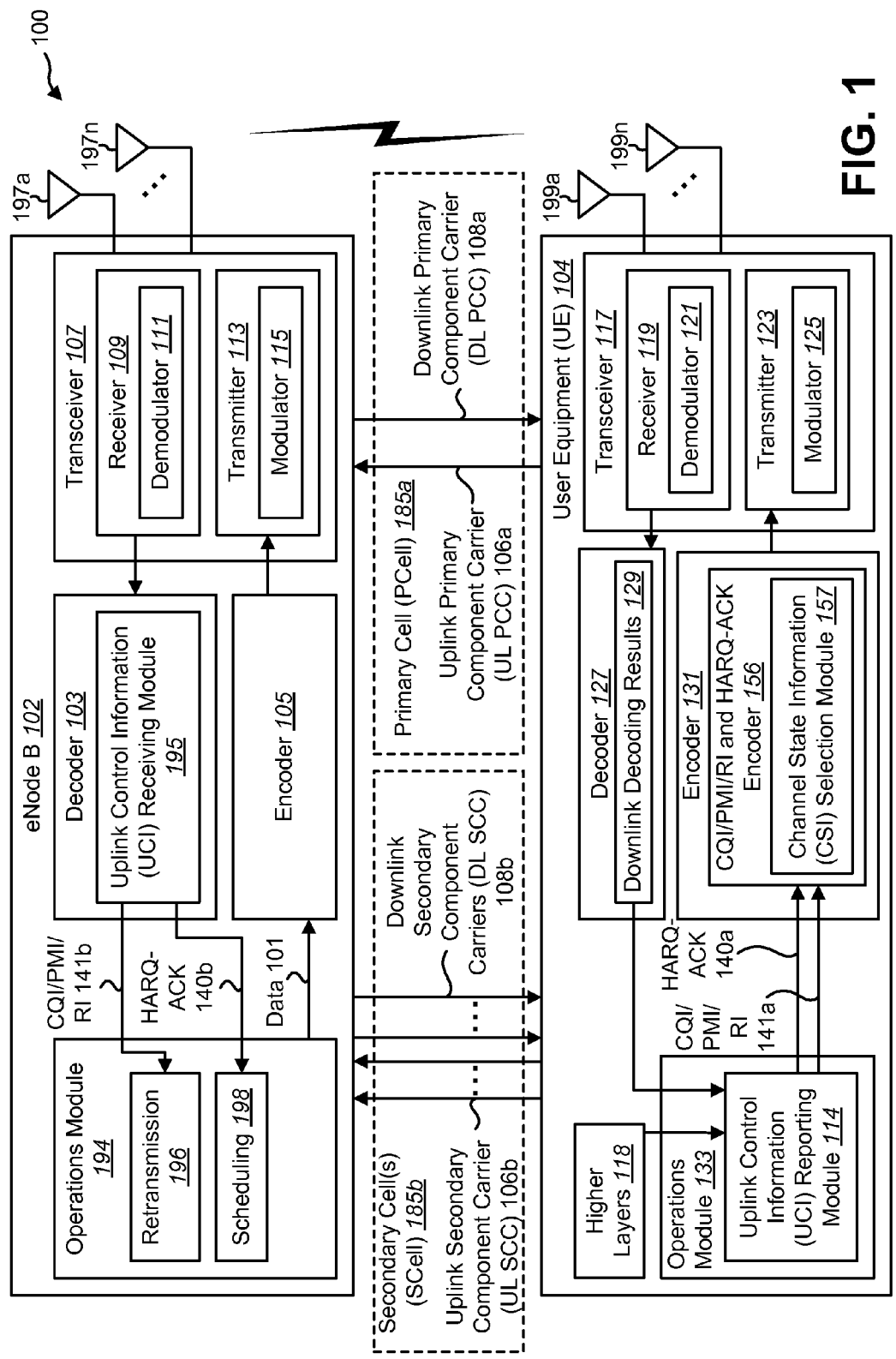
FIG. 1 is a block diagram illustrating a wireless communication system using uplink control information (UCI) multiplexing.

A method for reporting uplink control information (UCI) on a user equipment (UE) is described. A collision of multiple channel state information (CSI) reports corresponding to multiple component carriers (CCs) that are scheduled to be reported in the same subframe is detected. A highest priority CSI report of the multiple CSI reports is determined using a prioritization scheme. The highest priority CSI report is transmitted.

Determining a highest priority CSI report of the multiple CSI reports using a prioritization scheme may include determining a CC that most recently reported a rank indication (RI) and selecting a periodic CSI report corresponding to the determined CC as the highest priority CSI report. Determining a highest priority CSI report of the multiple CSI reports using a prioritization scheme may also include determining a CC that has not reported a rank indication (RI) for the longest period of time and selecting a periodic CSI report corresponding to the determined CC as the highest priority CSI report.

Determining a highest priority CSI report of the multiple CSI reports using a prioritization scheme may include transmitting a CSI report that is rank indication (RI). The CSI report may correspond to a first CC. Determining a highest priority CSI report of the multiple CSI reports using a prioritization scheme may further include adjusting a priority of the first CC to a highest priority. Determining a highest priority CSI report of the multiple CSI reports using a prioritization scheme may also include starting a timer for the first CC and transmitting only a CSI report corresponding to the first CC when a collision is detected and the timer has not expired.

If the timer has expired, determining a highest priority CSI report of the multiple CSI reports using a prioritization scheme may include transmitting only a CSI report corresponding to the first CC when a collision is detected until a periodic CSI report that is RI corresponding to a second CC is transmitted.

Determining a highest priority CSI report of the multiple CSI reports using a prioritization scheme may include transmitting a periodic CSI report that is RI corresponding to a second CC, adjusting the priority of the first CC to an original priority, adjusting a priority of the second CC to a highest priority and starting a timer for the second CC.

Determining a highest priority CSI report of the multiple CSI reports using a prioritization scheme may include determining a value of a most recently transmitted rank indication (RI) for each CC and selecting the CSI report corresponding to the CC with the highest value of the most recently transmitted RI as the highest priority CSI report.

Determining a highest priority CSI report of the multiple CSI reports using a prioritization scheme may instead include determining a value of a most recently transmitted rank indication (RI) for each CC and selecting the CSI report corresponding to the CC with the lowest value of the most recently transmitted RI as the highest priority CSI report.

Determining a highest priority CSI report of the multiple CSI reports using a prioritization scheme may include determining a CC with feedback that has a lowest payload size and selecting the CSI report corresponding to the CC with feedback that has the lowest payload size as the highest priority CSI report.

Determining a highest priority CSI report of the multiple CSI reports using a prioritization scheme may instead include determining a CC with feedback that has a highest payload size and selecting the CSI report corresponding to the CC with feedback that has the highest payload size as the highest priority CSI report.

Determining a highest priority CSI report of the multiple CSI reports using a prioritization scheme may also include applying feedback content prioritization to the multiple CSI reports and determining whether a single CSI report or multiple CSI reports are identified as having the highest priority.

If multiple CSI reports are identified as having the highest priority, determining a highest priority CSI report of the multiple CSI reports using a prioritization scheme may also include applying radio resource control (RRC) configured prioritization to the multiple CSI reports identified as having the highest priority to obtain a single highest priority CSI report. The UE may use a radio resource control (RRC) parameter to select whether a first step of prioritization scheme is based on explicitly signaled RRC signaling ordering, implicitly derived CC order from RRC signaling or content ordering.

The multiple CSI reports may include multiple periodic CSI reports. The highest priority CSI report may be transmitted on the physical uplink control channel (PUCCH). Multiple highest priority CSI reports may be transmitted on the physical uplink shared channel (PUSCH).

A user equipment (UE) configured for reporting uplink control information (UCI) is also described. The UE includes a processor, memory in electronic communication with the processor and instructions stored in the memory. The instructions are executable to detect a collision of multiple channel state information (CSI) reports corresponding to multiple component carriers (CCs) that are scheduled to be reported in the same subframe. The instructions are also executable to determine a highest priority CSI report of the multiple CSI reports using a prioritization scheme. The instructions are further executable to transmit the highest priority CSI report.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNode B 102 may be in wireless communication with one or more user equipments (UEs) 104. An eNode B 102 may be referred to as an access point, a Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology.

Communication between a user equipment (UE) 104 and an eNode B 102 may be accomplished using transmissions over a wireless link, including an uplink and a downlink. The uplink refers to communications sent from a user equipment (UE) 104 to an eNode B 102. The downlink refers to communications sent from an eNode B 102 to a user equipment (UE) 104. The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNode B 102 may have multiple antennas and a user equipment (UE) 104 may have multiple antennas. In this way, the eNode B 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNode B 102 using one or more antennas 199a-n. The user equipment (UE) 104 may include a transceiver 117, a decoder 127, an encoder 131 and an operations module 133. The transceiver 117 may include a receiver 119 and a transmitter 123. The receiver 119 may receive signals from the eNode B 102 using one or more antennas 199a-n. For example, the receiver 119 may receive and demodulate received signals using a demodulator 121. The transmitter 123 may transmit signals to the eNode B 102 using one or more antennas 199a-n. For example, the transmitter 123 may modulate signals using a modulator 125 and transmit the modulated signals.

The receiver 119 may provide a demodulated signal to the decoder 127. The user equipment (UE) 104 may use the decoder 127 to decode signals and make downlink decoding results 129. The downlink decoding results 129 may indicate whether data was received correctly. For example, the downlink decoding results 129 may indicate whether a packet was correctly or erroneously received (i.e., positive acknowledgement, negative acknowledgement or discontinuous transmission (no signal)).

The operations module 133 may be a software and/or hardware module used to control user equipment (UE) 104 communications. For example, the operations module 133 may determine when the user equipment (UE) 104 requires resources to communicate with an eNode B 102.

In $3^{rd}$ Generation Partnership Project (3GPP) Long Term Evolution (LTE)—Advanced, additional control feedback will have to be sent on control channels to accommodate MIMO and carrier aggregation. Carrier aggregation refers to transmitting data on multiple component carriers (CCs) or cells that are contiguously or separately located. Both the hybrid automatic repeat and request (ARQ) acknowledgement (HARQ-ACK) with positive-acknowledge and negative-acknowledge (ACK/NACK) bits and other control information may be transmitted using the physical uplink control channel (PUCCH). In carrier aggregation (CA), only one uplink component carrier (CC) or cell may be utilized for transmission of control information. In LTE-A, component carriers (CCs) are referred to as cells.

The user equipment (UE) 104 may transmit uplink control information (UCI) to an eNode B 102 on the uplink. The uplink control information (UCI) may include a channel quality indicator (CQI), a precoding matrix indicator (PMI), rank indication (RI), a scheduling request (SR) and a hybrid automatic repeat request acknowledgement (HARQ-ACK) 140*a*. HARQ-ACK 140*a* means ACK (positive-acknowledgement) and/or NACK (negative-acknowledgement) and/or DTX (discontinuous transmission) responses for HARQ operation, also known as ACK/NACK. If a transmission is successful, the HARQ-ACK 140*a* may have a logical value of 1 and if the transmission is unsuccessful, the HARQ-ACK 140*a* may have a logical value of 0.

In one configuration, the CQI/PMI/RI 141*a* and the HARQ-ACK 140*a* may be separately coded. In another configuration, the CQI/PMI/RI 141*a* and the HARQ-ACK 140*a* may be jointly coded. Herein, CQI/PMI/RI 141 refers to CQI and/or PMI and/or RI. CQI/PMI/RI 141 may also be referred to as channel state information (CSI). The CQI and/or PMI and/or RI may be reported together or independently based on the physical uplink control channel (PUCCH) reporting modes. ACK/NACK refers to ACK and/or NACK. CQI/PMI/RI 141 and HARQ-ACK 140 refers to ((CQI and/or PMI and/or RI) AND HARQ-ACK 140). CQI/PMI/RI 141 or HARQ-ACK 140 refers to ((CQI and/or PMI and/or RI) OR HARQ-ACK 140). The CQI/PMI/RI 141 may be collectively referred to as channel state information (CSI). A channel state information (CSI) report thus may include a CQI/PMI/RI 141 report. Channel state information (CSI) is discussed in additional detail below in relation to FIG. 2.

Channel state information (CSI) reporting from a user equipment (UE) 104 to an eNode B 102 may be periodic or aperiodic. Aperiodic channel state information (CSI) reports may be requested by an eNode B 102. Aperiodic channel state information (CSI) reports are not transmitted on the physical uplink control channel (PUCCH). Periodic channel state information (CSI) reports may be configured by an eNode B 102, so that a user equipment (UE) 104 reports channel state information (CSI) to the eNode B 102 at pre-specified subframes. When periodic channel state information (CSI) reports are scheduled for transmission, if only the physical uplink control channel (PUCCH) is available, one periodic channel state information (CSI) report corresponding to one component carrier (CC) 108 may be transmitted on the physical uplink control channel (PUCCH). In Rel-8/9, simultaneous physical uplink shared channel (PUSCH) and physical uplink control channel (PUCCH) transmission is not allowed. Thus, if a physical uplink shared channel (PUSCH) is scheduled, one periodic channel state information (CSI) report may be multiplexed on the physical uplink shared channel (PUSCH). Aperiodic channel state information (CSI) reports are always transmitted on the physical uplink shared channel (PUSCH). Hence, there is a need for a distinction between periodic channel state information (CSI) reports and aperiodic channel state information (CSI) reports.

The CQI/PMI/RI 141*a* report and the HARQ-ACK 140*a* may be generated by the uplink control information (UCI) reporting module 114 and transferred to a CQI/PMI/RI and HARQ-ACK encoder 156 that is part of the encoder 131. The CQI/PMI/RI and HARQ-ACK encoder 156 may generate uplink control information (UCI) using backwards compatible physical uplink control channel (PUCCH) formats and physical uplink shared channel (PUSCH) formats. Backwards compatible physical uplink control channel (PUCCH) formats are those formats that may be used by Release-10 user equipments (UEs) 104 as well as Release-8/9 user equipments (UEs) 104.

The CQI/PMI/RI and HARQ-ACK encoder 156 may include a channel state information (CSI) selection module 157. In Release-8, a user equipment (UE) 104 does not simultaneously transmit on the physical uplink control channel (PUCCH) and the physical uplink shared channel (PUSCH). Aperiodic channel state information (CSI) reports are always transmitted on the physical uplink shared channel (PUSCH). Only one channel state information (CSI) report may be transmitted on the physical uplink control channel (PUCCH). Thus, the channel state information (CSI) selection module 157 may be used to determine which channel state information (CSI) report should be transmitted on the physical uplink control channel (PUCCH).

One resource of the physical uplink control channel (PUCCH) may be allocated for transmission of the uplink control information (UCI) with collision resolution procedures resolving any collision issues. In general, the resource allocated for the transmission of HARQ-ACK 140*a* is different from the resource allocated for the transmission of periodic channel state information (CSI) on the physical uplink control channel (PUCCH). If only one of the HARQ-ACK 140*a* and the periodic channel state information (CSI) is available for transmission, the corresponding resource is used for transmissions. In case of a collision in the schedule of the transmission of HARQ-ACK 140*a* and channel state information (CSI), a collision resolution procedure may be used to determine the resource and format used for transmission. If the physical uplink shared channel (PUSCH) is available, the aperiodic channel state information (CSI) reports may take priority over periodic channel state information (CSI) reports and be time and/or frequency shared with the HARQ-ACK 140.

In 3GPP LTE Release-10 (LTE-A or Advanced EUTRAN), simultaneous physical uplink shared channel (PUSCH) and physical uplink control channel (PUCCH) transmission is introduced and can be configured. A user equipment (UE) 104 may have several transmission modes including physical uplink control channel (PUCCH) only transmission (when no physical uplink shared channel (PUSCH) is scheduled), physical uplink shared channel (PUSCH) only transmission (when simultaneous physical uplink shared channel (PUSCH) and physical uplink control channel (PUCCH) transmission is not configured and a physical uplink shared channel (PUSCH) is scheduled) and simultaneous physical uplink shared channel (PUSCH) and physical uplink control channel (PUCCH) transmission when it is configured. If simultaneous physical uplink shared channel (PUSCH) and physical uplink control channel (PUCCH) transmission is configured, the physical uplink control channel (PUCCH) is assumed to always be available to send uplink control information (UCI). The physical uplink control channel (PUCCH) for CQI/PMI/RI 141*a* may be semi-statically scheduled by an eNode B 102, but the physical uplink control channel (PUCCH) for ACK/NACK may be dynamically allocated based on downlink configurations and transmission.

When multiple channel state information (CSI) reports from more than one component carrier (CC) 108 or cell 185 are scheduled to be reported in the same subframe or when different types of channel state information (CSI) from the same component carrier (CC) are scheduled to be reported in the same subframe, this may be referred to as a collision. A user equipment (UE) 104 that has multiple uplink control information (UCI) elements for transmission may experience a collision. Some collision resolution procedures have already been defined for Rel-8. However, additional collision resolution procedures for Rel-10 may be needed.

The use of simultaneous physical uplink shared channel (PUSCH) and physical uplink control channel (PUCCH) transmissions may be configured by a radio resource control (RRC) configuration based on user equipment (UE) 104 specific radio resource control (RRC) signaling. When a user equipment (UE) 104 that is configured for simultaneous physical uplink shared channel (PUSCH) and physical uplink control channel (PUCCH) transmission is allocated or assigned both the physical uplink shared channel (PUSCH) and the physical uplink control channel (PUCCH) on a subframe or when the user equipment (UE) 104 is required to transmit on both the physical uplink shared channel (PUSCH) and the physical uplink control channel (PUCCH) on a subframe, the user equipment (UE) 104 may transmit on the physical uplink shared channel (PUSCH) and the physical uplink control channel (PUCCH) simultaneously.

The user equipment (UE) 104 may also transmit a reference signal (RS) to an eNode B 102. The uplink control information (UCI) may be transmitted using the physical uplink control channel (PUCCH) and/or the physical uplink shared channel (PUSCH). One or more physical uplink control channel (PUCCH) reference signal (RS) symbols are included in a physical uplink control channel (PUCCH) signal transmission on each slot.

The time and frequency resources may be quantized to create a grid known as the Time-Frequency grid. In the time domain, 10 milliseconds (ms) is referred to as one radio frame. One radio frame may include 10 subframes, each with a duration of 1 ms, which is the duration of transmission in the uplink and/or downlink. Every subframe may be divided into two slots, each with a duration of 0.5 ms. Each slot may be divided into 7 symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), one RB at each slot. One RB has a duration of 0.5 ms (7 symbols or one slot) in the time domain and a bandwidth of 12 subcarriers (180 kHz) in the frequency domain. At any given subframe, a maximum of two RBs (one RB at each slot) can be used by a given user equipment (UE) 104 for the transmission of uplink control information (UCI) in the physical uplink control channel (PUCCH). However, the eNode B 102 may allocate different RBs for the transmission of HARQ-ACK 140*a* and periodic channel state information (CSI). In case of a collision, a collision resolution mechanism may decide which RB and what format are used for the transmission of both or one of the HARQ-ACK 140*a* and the periodic channel state information (CSI).

In LTE Release-8, only one uplink component carrier (CC) 106 or cell 185 and one downlink component carrier (CC) 108 or cell 185 can be used for transmission to and reception from each user equipment (UE) 104. The uplink control information (UCI) such as ACK/NACK bits for hybrid ARQ (HARQ) 140*a* and periodic channel quality indicators (CQI), periodic precoding matrix indicator (PMI) and periodic rank indication (RI) can be sent on the physical uplink control channel (PUCCH), on the physical uplink shared channel (PUSCH) or on both. In one configuration where simultaneous physical uplink shared channel (PUSCH) and physical uplink control channel (PUCCH) transmission is configured, there may be a first uplink control information (UCI) that is scheduled on the physical uplink control channel (PUCCH) and a second uplink control information (UCI) that is scheduled on the physical uplink shared channel (PUSCH). In some conditions, for example in cases when simultaneous physical uplink shared channel (PUSCH) and physical uplink control channel (PUCCH) transmission is not configured, the uplink control information (UCI) that is scheduled on the physical uplink control channel (PUCCH) may be transmitted on the physical uplink shared channel (PUSCH) if a physical uplink shared channel (PUSCH) is scheduled in the subframe.

The physical uplink control channel (PUCCH) may occupy one resource block (RB) at each slot. Thus, a very limited amount of information can be transmitted on the physical uplink control channel (PUCCH).

In 3GPP Long Term Evolution (LTE) Release-10 (LTE-A or Advanced EUTRAN), carrier aggregation was introduced. Carrier aggregation may also be referred to as cell aggregation. Carrier aggregation is supported in both the uplink and the downlink with up to five component carriers (CCs) 106, 108, also known as cells 185. Each component carrier (CC) 106, 108 or cell 185 may have a transmission bandwidth of up to 110 resource blocks (i.e., up to 20 megahertz (MHz)). In carrier aggregation, two or more component carriers (CCs) 106, 108 or cells 185 are aggregated to support wider transmission bandwidths up to one hundred megahertz (MHz). A user equipment (UE) 104 may simultaneously receive and/or transmit on one or multiple component carriers (CCs) 106, 108 or cells 185, depending on the capabilities of the user equipment (UE) 104.

Based on current agreements, cyclic reporting of periodic CQI/PMI/RI 141 of each component carrier (CC) 108 or cell is supported in Release-10. Thus, the same periodic CQI/PMI/RI 141 payload as in Release-8 can be used. Therefore, a Format 2 or Format 3 based physical uplink control channel (PUCCH) may be reused for periodic CQI/PMI/RI 141 reporting of each component carrier (CC) 108 or cell 185.

A user equipment (UE) 104 may communicate with an eNode B 102 using multiple component carriers (CCs) 108 or cells 185 at the same time. For example, a user equipment (UE) 104 may communicate with an eNode B 102 using a primary cell (PCell) 185*a* while simultaneously communicating with the eNode B 102 using secondary cell(s) (SCell) 185*b*. Similarly, an eNode B 102 may communicate with a user equipment (UE) 104 using multiple component carriers (CCs) 108 or cells 185 at the same time. For example, an eNode B 102 may communicate with a user equipment (UE) 104 using a primary cell (PCell) 185*a* while simultaneously communicating with the user equipment (UE) 104 using secondary cell(s) (SCell) 185*b*.

An eNode B 102 may include a transceiver 107 that includes a receiver 109 and a transmitter 113. An eNode B 102 may additionally include a decoder 103, an encoder 105 and an operations module 194. An eNode B 102 may receive uplink control information (UCI) using its one or more antennas 197*a-n* and its receiver 109. The receiver 109 may use the demodulator 111 to demodulate the uplink control information (UCI).

The decoder 103 may include an uplink control information (UCI) receiving module 195. An eNode B 102 may use the uplink control information (UCI) receiving module 195 to decode and interpret the uplink control information (UCI) received by the eNode B 102. The eNode B 102 may use the decoded uplink control information (UCI) to perform certain operations, such as retransmit one or more packets based on scheduled communication resources for the user equipment (UE) 104. The uplink control information (UCI) may include a CQI/PMI/RI 141*b* and/or an HARQ-ACK 140*b*.

The operations module 194 may include a retransmission module 196 and a scheduling module 198. The retransmission module 196 may determine which packets to retransmit (if any) based on the uplink control information (UCI). The scheduling module 198 may be used by the eNode B 102 to schedule communication resources (e.g., bandwidth, time slots, frequency channels, spatial channels, etc.). The scheduling module 198 may use the uplink control information (UCI) to determine whether (and when) to schedule communication resources for the user equipment (UE) 104.

The operations module 194 may provide data 101 to the encoder 105. For example, the data 101 may include packets for retransmission and/or a scheduling grant for the user equipment (UE) 104. The encoder 105 may encode the data 101, which may then be provided to the transmitter 113. The transmitter 113 may modulate the encoded data using the modulator 115. The transmitter 113 may transmit the modulated data to the user equipment (UE) 104 using one or more antennas 197*a-n*.

When carrier aggregation is configured, a user equipment (UE) 104 may have only one radio resource control (RRC) connection with the network. At the radio resource control (RRC) connection establishment/re-establishment/handover, one serving cell 185 (i.e., the primary cell (PCell) 185*a*) provides the non-access stratum (NAS) mobility information (e.g., Tracking Area Identity (TAI)) and the security input.

In the downlink, the component carrier (CC) 108 corresponding to the primary cell (PCell) 185*a* is the downlink primary component carrier (DL PCC) 108*a*. In the uplink, the component carrier (CC) 106 corresponding to the primary cell (PCell) 185*a* is the uplink primary component carrier (UL PCC) 106*a*. Depending on the capabilities of the user equipment (UE) 104, one or more secondary component carriers (SCC) 106*b*, 108*b* or secondary cells (SCell) 185*b* may be configured to form a set of serving cells with the primary cell (PCell) 185*a*. In the downlink, the component carrier (CC) 108 corresponding to the secondary cell (SCell) 185*b* is the downlink secondary component carrier (DL SCC) 108*b*. In the uplink, the component carrier (CC) 106 corresponding to the secondary cell (SCell) 185*b* is the uplink secondary component carrier (UL SCC) 106*b*. The number of downlink component carriers (CCs) 108 or cells 185 may be different from the number of uplink component carriers (CCs) 106 or cells 185 because multiple user equipments (UEs) 104 may share one uplink component carrier (CC) 106.

In LTE-A, the component carriers (CCs) 106, 108 are referred to as cells 185. If carrier aggregation is configured, a user equipment (UE) 104 may have multiple serving cells: a primary cell (PCell) 185*a* and one or more secondary cells (SCell) 185*b*. From a network perspective, the same serving cell 185 may be used as the primary cell (PCell) 185*a* by one user equipment (UE) 104 and used as a secondary cell (SCell) 185*b* by another user equipment (UE) 104. A primary cell (PCell) 185*a* that is operating according to Release-8/9 is equivalent to the Release-8/9 serving cell. When operating according to Release-10, there may be one or more secondary cells (SCell) 185*b* in addition to the primary cell (PCell) 185*a* if carrier aggregation is configured.

A number of spatial channels may be available on each serving cell 185 by using multiple antennas at a transmitter and a receiver. Therefore, multiple codewords (up to two codewords) may be transmitted simultaneously. If the user equipment (UE) 104 is configured with five component carriers (CCs) 106, 108 or cells 185 and two codewords for each of the component carriers (CCs) 106, 108 or cells 185, ten HARQ-ACK 140 acknowledgement/negative acknowledgement (ACK/NACK) bits for a single downlink subframe may be generated by the user equipment (UE) 104. One benefit of using carrier aggregation is that additional downlink and/or uplink data may be transmitted. As a result of the additional downlink data, additional uplink control information (UCI) may be needed.

It has been agreed that for periodic CQI/PMI/RI 141 reporting for carrier aggregation, the configuration of different (in time) physical uplink control channel (PUCCH) resources for reports for each component carrier (CC) 106, 108 or cell 185 is supported.

A channel state information (CSI) report may be generated for each component carrier (CC) 106, 108 or cell 185. In Rel-10, it has been agreed that periodic channel state information (CSI) reporting for up to five downlink component carriers (CCs) 108 or cells 185 on the physical uplink control channel (PUCCH) on a single UE-specific uplink component carrier (CC) 106 or cell 185 should be supported. A channel state information (CSI) report may be used to inform the eNode B 102 to adjust the transmission rate (modulation scheme and coding rate) dynamically based on the existing channel conditions at the user equipment (UE) 104. For example, if a channel state information (CSI) report indicates a good channel quality at the user equipment (UE) 104, the eNode B 102 may select a higher order modulation and coding rate, thereby achieving a higher transmission rate for the downlink transmission of data on the physical downlink shared channel (PDSCH). If a channel state information (CSI) report indicates a poor channel quality at the user equipment (UE) 104, the eNode B 102 may select a lower order modulation and coding rate, thereby achieving higher reliability for the transmission.

A channel state information (CSI) report may be referred to as a rank indication (RI) report if the channel state information (CSI) report includes rank indication (RI). A channel state information (CSI) report may be referred to as a channel quality indicator (CQI) report if the channel state information (CSI) report includes a channel quality indicator (CQI). A channel state information (CSI) report may be referred to as a precoding matrix indicator (PMI) report if the channel state information (CSI) report includes a precoding matrix indicator (PMI).

Figure 2:
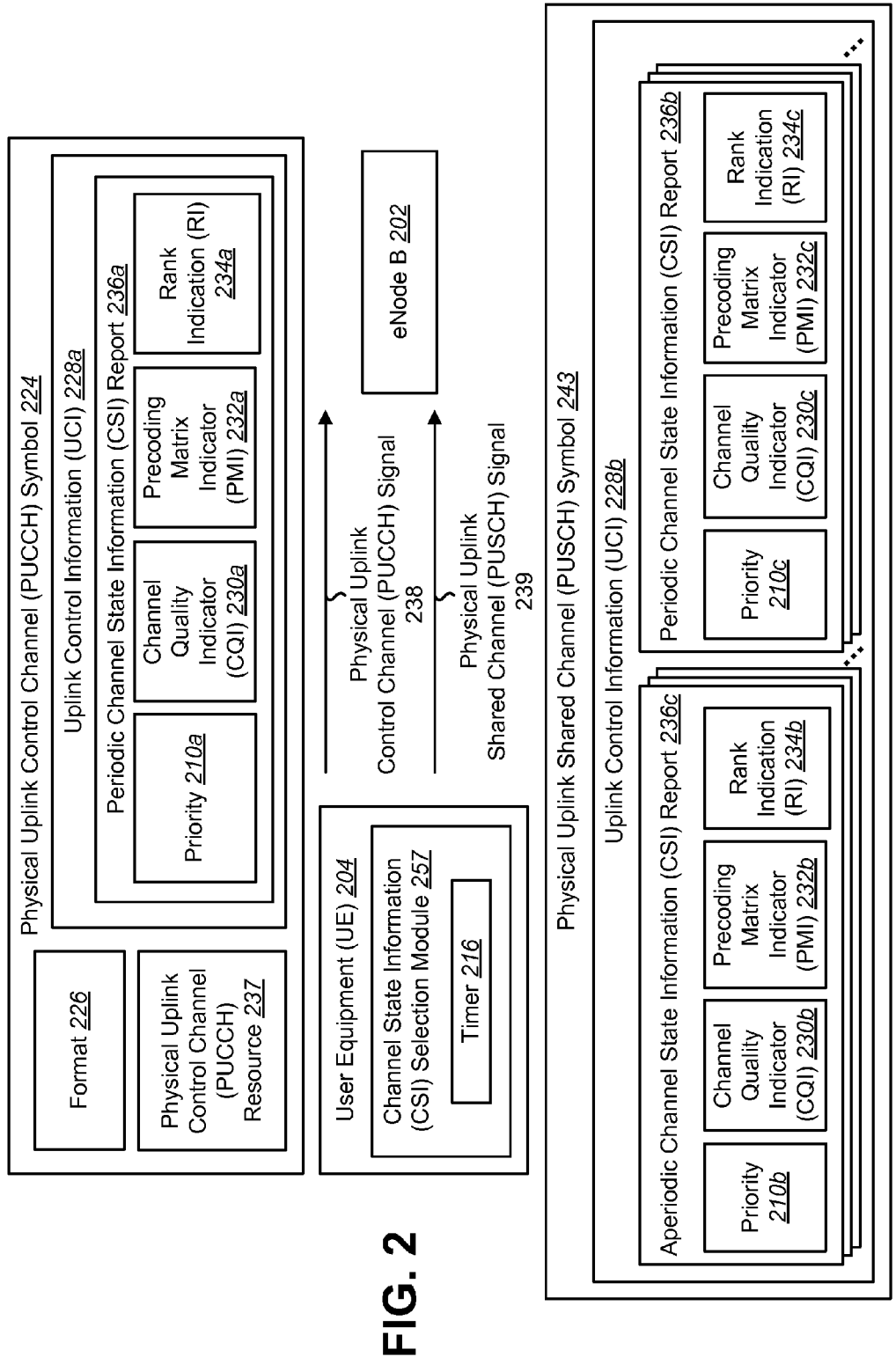
FIG. 2 is a block diagram illustrating transmissions from a user equipment (UE) to an eNode B during a subframe.

FIG. 2 is a block diagram illustrating transmissions from a user equipment (UE) 204 to an eNode B 202 during a subframe. The user equipment (UE) 204 may transmit a physical uplink control channel (PUCCH) symbol 224 via a physical uplink control channel (PUCCH) signal 238 to the eNode B 202. The user equipment (UE) 204 may also transmit a physical uplink shared channel (PUSCH) symbol 243 via a physical uplink shared channel (PUSCH) signal 239 to the eNode B 202. In one configuration, the user equipment (UE) 204 may simultaneously transmit a physical uplink control channel (PUCCH) symbol 224 and a physical uplink shared channel (PUSCH) symbol 243 to the eNode B 202.

Simultaneous transmission on the physical uplink control channel (PUCCH) and the physical uplink shared channel (PUSCH) is introduced and configurable in Release-10. In Release-8 and Release-9, simultaneous transmission on the physical uplink control channel (PUCCH) and the physical uplink shared channel (PUSCH) is not allowed. Thus, all references to simultaneous transmission on the physical uplink control channel (PUCCH) and the physical uplink shared channel (PUSCH) are related to Release-10, and not to Release-8 or Release-9.

The physical uplink control channel (PUCCH) symbol 224 may include uplink control information (UCI) 228a. The uplink control information (UCI) 228a may include a periodic channel state information (CSI) report 236a. A channel state information (CSI) report 236 refers to the channel state information (CSI) of each of the downlink component carriers (CCs) 108. The periodic channel state information (CSI) report 236a may include a channel quality indicator (CQI) 230a, a precoding matrix indicator (PMI) 232a, and/or a rank indication (RI) 234a. A channel quality indicator (CQI) 230 indicates the modulation and coding rate. A precoding matrix indicator (PMI) 232 indicates the codebook for precoding using multiple-input and multiple-output (MIMO). The rank indication (RI) 234 is the number of useful transmission layers for a multiple-input and multiple-output (MIMO) transmission.

The CQI, PMI and RI may be reported in a periodic channel state information (CSI) report 236a-b or an aperiodic channel state information (CSI) report 236c. Periodic channel quality indicator (CQI) reports 236a from a frequency selective scheduling mode may be transmitted on the physical uplink control channel (PUCCH). Aperiodic channel state information (CSI) reports 236c from a frequency selective scheduling mode may be transmitted on the physical uplink shared channel (PUSCH). Periodic channel state information (CSI) reports 236a from a frequency non-selective scheduling mode may be transmitted on the physical uplink control channel (PUCCH). In Rel-8, when both periodic and aperiodic reporting would occur in the same subframe, the user equipment (UE) 204 would only transmit the aperiodic channel state information (CSI) report 236c in that subframe. In other words, for a frequency non-selective scheduling mode, only periodic channel quality indicator (CQI) feedback is needed. For frequency selective scheduling, both periodic and aperiodic feedback information is needed.

Each channel state information (CSI) report 236 may have a priority 210a-c. For example, if multiple channel state information (CSI) reports 236 for multiple component carriers (CCs) 108 or cells 185 need to be transmitted in a subframe, the most important uplink control information (UCI) 228 may be transmitted on the physical uplink control channel (PUCCH) and the dropped channel state information (CSI) reports 236 from the physical uplink control channel (PUCCH) may be carried on the physical uplink shared channel (PUSCH).

In Rel-8/9, only one component carrier (CC) 108 or cell 185 is allocated for a user equipment (UE) 204. Thus, only one periodic channel state information (CSI) report 236a-b is generated (i.e., CQI and/or PMI and/or RI for one component carrier (CC) 108 per cell 185 is reported). For aperiodic channel state information (CSI) reports 236c, the rank indication (RI) 234b is transmitted only if the configured CQI/PMI/RI feedback type supports rank indication (RI) 234b reporting. In cases where both a periodic channel state information (CSI) report 236a-b and an aperiodic channel state information (CSI) report 236c would occur in the same subframe, the user equipment (UE) 204 would only transmit the aperiodic channel state information (CSI) report 236c for that subframe.

In Rel-10 and beyond, multiple component carriers (CCs) 108 or cells 185 may be configured for a user equipment (UE) 204. Thus, multiple periodic channel state information (CSI) reports 236a-b corresponding to multiple component carriers (CCs) 108 or cells 185 may collide in the same subframe (i.e., the multiple periodic channel state information (CSI) reports 236a-b may have schedules that would force them to be transmitted in the same subframe). Because the periodic channel state information (CSI) reports 236a-b may include valuable control information that is not included in an aperiodic channel state information (CSI) report 236c, it may be beneficial to not drop the periodic channel state information (CSI) reports 236a-b.

With the introduction of multiple component carriers (CCs) 108 or cells 185 in Rel-10 or LTE-Advanced (LTE-A), the amount of channel state information (CSI) that needs to be reported can increase significantly, since the channel state information (CSI) report 236 for each of the component carriers (CCs) 108 or cells 185 needs to be reported. However, the physical uplink control channel (PUCCH) may only be able to support transmission of one channel state information (CSI) report 236 for one component carrier (CC) 108 or cell 185. When simultaneous physical uplink control channel (PUCCH) and physical uplink shared channel (PUSCH) transmission is enabled, the periodic channel state information (CSI) report 236a with the highest priority 210a may be carried on the physical uplink control channel (PUCCH) while the remaining periodic channel state information (CSI) reports 236b are carried on the physical uplink shared channel (PUSCH) (or dropped). The priority of different types of uplink control information (UCI) 228 may be provided by the eNode B 202 or by predefined rules. Some of the predefined rules are disclosed herein.

The CQI/PMI/RI 141 of each component carrier (CC) 108 or cell 185 may be scheduled on the physical uplink control channel (PUCCH) periodically by higher layer 118 signaling (the CQI/PMI/RI 141 is periodic CQI/PMI/RI 141). The eNode B 202 may request periodic channel state information (CSI) 236a-b and aperiodic channel state information (CSI) 236c; the periodic channel state information (CSI) 236a-b may have a periodic reporting schedule while the aperiodic channel state information (CSI) 236c is generated dynamically and not configured by a periodic schedule. The eNode B 102 may also request transmission of CQI/PMI/RI 141. Such a request may be made through the physical downlink control channel (PDCCH) and the CQI/PMI/RI 141 reported in response to such a request may be referred to as aperiodic CQI/PMI/RI 141. The physical uplink control channel (PUCCH) symbol 224 may be sent only on the primary cell (PCell) 185a.

The physical uplink control channel (PUCCH) symbol 224 may further include a format 226 for which the physical uplink control channel (PUCCH) symbol 224 is transmitted. For example, the physical uplink control channel (PUCCH) symbol 224 may be transmitted using Format 1/1a/1b, Format 2/2a/2b, Format 3/3a/3b or any other new formats. As used herein, Format 1/1a/1b represents Format 1 and/or Format 1a and/or Format 1b. Also, as used herein, Format 2/2a/2b represents Format 2 and/or Format 2a and/or Format 2b. Herein, Format 3/3a/3b represents Format 3 and/or Format 3a and/or Format 3b.

The physical uplink control channel (PUCCH) symbol 224 may also include a physical uplink control channel (PUCCH) resource 237. The physical uplink control channel (PUCCH) resource 237 for the periodic CQI/PMI/RI 141 may be periodically pre-assigned by a higher layer 118, which uses Format 2/2a/2b. It may be possible in Rel-10 or a future release to transmit periodic CQI/PMI/RI using Format 3/3a/3b, especially in conjunction with ACK/NACK.

The physical uplink shared channel (PUSCH) symbol 243 may also include uplink control information (UCI) 228*b*. The uplink control information (UCI) 228*b* may include one or more aperiodic channel state information (CSI) reports 236*c* and one or more periodic channel state information (CSI) reports 236*b*. The number of aperiodic channel state information (CSI) reports 236*c* and the number of periodic channel state information (CSI) reports 236*b* may be signaled by the eNode B 202 via radio resource control (RRC) signaling.

An eNode B 202 may trigger aperiodic channel state information (CSI) reporting on the physical uplink shared channel (PUSCH) in an on-demand basis. An aperiodic channel state information (CSI) report 236*c* may collide with one or more periodic channel state information (CSI) reports 236*a-b* that are scheduled for the same subframe. Unlike in Rel-8, the aperiodic channel state information (CSI) report 236*c* in Rel-10 may have channel state information (CSI) for more than one component carrier (CC) 108 or cell 185. The aperiodic channel state information (CSI) report 236*c* may include channel state information (CSI) for different component carriers (CCs) 108 or cells 185 than the periodic channel state information (CSI) reports 236*a-b*.

Each aperiodic channel state information (CSI) report 236*c* may include channel state information (CSI) for one or more component carriers (CCs) 108 or cells 185. An aperiodic channel state information (CSI) report 236*c* may include channel state information (CSI) for different component carriers (CCs) 108 or cells 185 from the periodic channel state information (CSI) reports 236*a-b*. In one configuration, an aperiodic channel state information (CSI) report 236*c* may include channel state information (CSI) for only one component carrier (CC) 108 or cell 185. In another configuration, an aperiodic channel state information (CSI) report 236*c* may include channel state information (CSI) for multiple component carriers (CCs) 108 or cells 185. In yet another configuration, an aperiodic channel state information (CSI) report 236*c* may be a combination of multiple aperiodic channel state information (CSI) reports 236*c*, each corresponding to one or more component carriers (CCs) 108 or cells 185. Dropping periodic channel state information (CSI) reports 236*a-b* of one component carrier (CC) 108 or cell 185 may cause a bad channel estimation of the component carrier (CC) 108 or cell 185.

An aperiodic channel state information (CSI) report 236*c* may include one or more channel quality indicators (CQIs) 230*b* and/or one or more precoding matrix indicators (PMIs) 232*b* and/or one or more rank indications (RIs) 234*b* of one or more component carriers (CCs) 108 or cells 185. The channel quality indicator (CQI) 230 may be a wideband channel quality indicator (CQI) 230, a subband channel quality indicator (CQI) 230 or a user equipment (UE) 104 selected subband channel quality indicator (CQI) 230. An aperiodic channel state information (CSI) report 236*c* is always transmitted on the physical uplink shared channel (PUSCH) symbol 243. A periodic channel state information (CSI) report 236*b* may also include a channel quality indicator (CQI) 230*c* and/or a precoding matrix indicator (PMI) 232*c* and/or a rank indication (RI) 234*c* and a priority 210*b*. The physical uplink shared channel (PUSCH) symbol 243 may be sent on the primary cell (PCell) 185*a* and/or on one or more secondary cells (SCell) 185*b*.

When multiple channel state information (CSI) reports 236 from more than one component carrier (CC) 108 or cell 185 are scheduled to be reported in the same subframe, this may be referred to as a collision. A collision may also occur when different types of channel state information (CSI) from the same component carrier (CC) 108 or cell 185 (e.g., CQI/PMI and RI) are scheduled to be reported in the same subframe. When a collision occurs, due to the low payload size of the physical uplink control channel (PUCCH), the user equipment (UE) 204 may select only one periodic channel state information (CSI) report 236*a* to be transmitted on the physical uplink control channel (PUCCH). Thus, some of the periodic channel state information (CSI) reports 236*a-b* may be dropped. A dropped channel state information (CSI) report 236*a-b* may be transmitted on the physical uplink shared channel (PUSCH).

The user equipment (UE) 204 may include a channel state information (CSI) selection module 257. The user equipment (UE) 204 may use the channel state information (CSI) selection module 257 to prioritize which channel state information (CSI) report 236 should be sent to an eNode B 202. In one configuration, the channel state information (CSI) selection module 257 may use a timer 216 (or multiple timers (not shown)) to prioritize channel state information (CSI) reports 236.

Many different methods may be used for selecting which periodic channel state information (CSI) report 236*a* is transmitted on the physical uplink control channel (PUCCH). These methods may also be used to select which periodic channel state information (CSI) report 236*b* or reports are transmitted on the physical uplink shared channel (PUSCH) and to select which aperiodic channel state information (CSI) report 236*c* or reports are transmitted on the physical uplink shared channel (PUSCH). These methods may also be applied for simultaneous physical uplink control channel (PUCCH) and physical uplink shared channel (PUSCH) transmissions.

For example, in Rel-8, when the physical uplink shared channel (PUSCH) is scheduled on the same subframe as the periodic CQI/PMI/RI 141*a* transmission on the physical uplink control channel (PUCCH), the periodic CQI/PMI/RI 141*a* is transmitted on the physical uplink shared channel (PUSCH). In Rel-10, due to the presence of multiple component carriers (CCs) 108 or cells 185, if all the periodic channel state information (CSI) reports 236*a-b* for all component carriers (CCs) 108 or cells 185 cannot be transmitted on the physical uplink shared channel (PUSCH) for both the physical uplink shared channel (PUSCH) only case and the simultaneous physical uplink shared channel (PUSCH) and physical uplink control channel (PUCCH) transmissions, the methods of prioritization discussed below in relation to FIGS. 5, 7, 9, 11 and 12 may be applied for the selection of the feedback contents to be transmitted on the physical uplink shared channel (PUSCH). Feedback contents may refer to any channel state information (CSI) report 236 that is scheduled for transmission.

For instance, if only one channel state information (CSI) report 236*b* of one component carrier (CC) 108 or cell 185 is transmitted on the physical uplink shared channel (PUSCH), the same prioritization rules may be used for the physical uplink shared channel (PUSCH) as is defined below for the physical uplink control channel (PUCCH) only. If m out of n channel state information (CSI) reports 236 (m<n)

are transmitted on the physical uplink shared channel (PUSCH), then the m component carriers (CCs) 108 or cells 185 may be selected by radio resource control (RRC) signaling or by applying the priority methods discussed below in relation to FIGS. 5, 7, 9 and 11 iteratively to obtain the top m component carriers (CCs) 108 or cells 185 with channel state information (CSI) reports 236 to be reported on the physical uplink shared channel (PUSCH). For example, the highest priority channel state information (CSI) report 236 is found from the n channel state information (CSI) reports 236, then the next highest priority channel state information (CSI) report 236 is found from the n−1 channel state information (CSI) reports 236, until m channel state information (CSI) reports 236 are obtained.

For simplicity, the examples used herein only refer to periodic channel state information (CSI) reports 236a that are transmitted on the physical uplink control channel (PUCCH).

Figure 3:
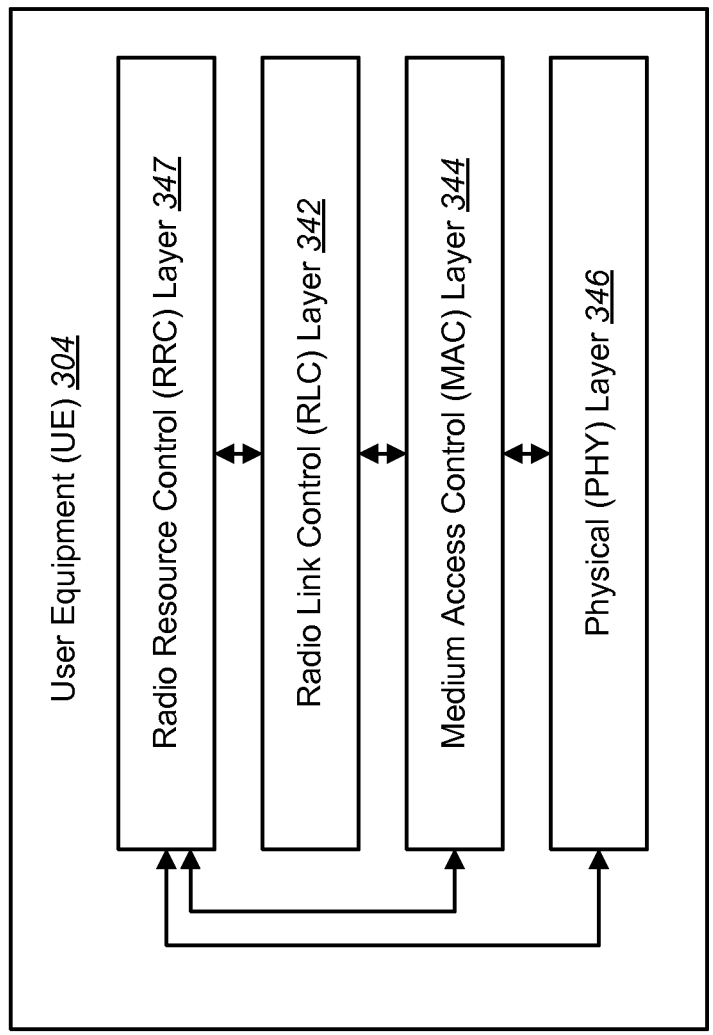
FIG. 3 is a block diagram illustrating the layers used by a user equipment (UE)

FIG. 3 is a block diagram illustrating the layers used by a user equipment (UE) 304. The user equipment (UE) 304 of FIG. 3 may be one configuration of the user equipment (UE) 104 of FIG. 1. The user equipment (UE) 304 may include a radio resource control (RRC) layer 347, a radio link control (RLC) layer 342, a medium access control (MAC) layer 344 and a physical (PHY) layer 346. These layers may be referred to as higher layers 118. The user equipment (UE) 304 may include additional layers not shown in FIG. 3.

Figure 4:
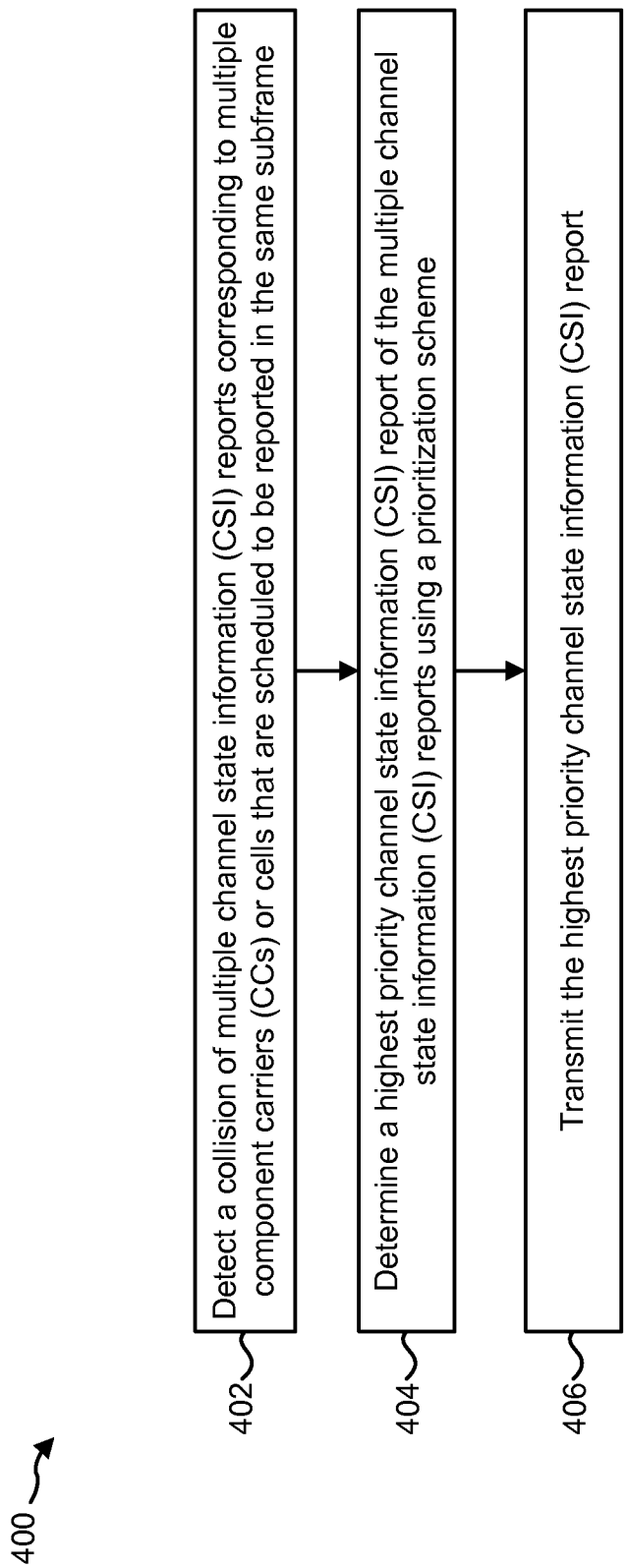
FIG. 4 is a flow diagram of a method for prioritizing the transmission of channel state information (CSI) reports.

FIG. 4 is a flow diagram of a method 400 for prioritizing the transmission of channel state information (CSI) reports 236. The method 400 may be performed by a user equipment (UE) 104. The user equipment (UE) 104 may detect 402 a collision of multiple channel state information (CSI) reports 236 corresponding to multiple component carriers (CCs) 108 or cells 185 that are scheduled to be reported in the same subframe. The channel state information (CSI) reports 236 may be periodic channel state information (CSI) reports 236a that are scheduled to be transmitted on the physical uplink control channel (PUCCH). Alternatively, the channel state information (CSI) reports 236 may be either aperiodic channel state information (CSI) reports 236c or periodic channel state information (CSI) reports 236b that are scheduled to be transmitted on the physical uplink shared channel (PUSCH).

The user equipment (UE) 104 may determine 404 a highest priority channel state information (CSI) report 236 of the multiple channel state information (CSI) reports 236 using a prioritization scheme. The highest priority channel state information (CSI) report 236 may be the channel state information (CSI) report 236 that includes the most important feedback information. The prioritization scheme may include one or a combination of the methods discussed below in relation to FIGS. 4, 5, 7, 9, 11 and 12. For example, the user equipment (UE) 104 may first eliminate all channel state information (CSI) reports 236 that are below the largest payload size. If more than one channel state information (CSI) report 236 remains, the user equipment (UE) 104 may then determine the component carrier (CC) 108 or cell 185 that most recently reported a rank indication (RI) 234 report and select the channel state information (CSI) report 236 corresponding to the component carrier (CC) 108 or cell 185 to be transmitted on the physical uplink control channel (PUCCH). In the event that the collision is still not resolved, the user equipment (UE) 104 may use radio resource control (RRC) based component carrier (CC) 108 or cell 185 prioritization (e.g., a primary cell 185a is prioritized over a secondary cell 185b or there is a semi-static radio resource control (RRC) configuration for prioritization of component carriers (CCs) 108 or cells 185) to resolve the collision.

Due to the limited transmission capacity of the physical uplink control channel (PUCCH), it is very likely that only one channel state information (CSI) report 236 corresponding to one component carrier (CC) 108 or cell 185 will be reported on the physical uplink control channel (PUCCH) in a subframe. Thus, the channel state information (CSI) reports 236 that are not the determined highest priority channel state information (CSI) report 236 may be dropped. For aperiodic channel state information (CSI) reports 236c and/or periodic channel state information (CSI) reports 236b that are scheduled to be transmitted on the physical uplink shared channel (PUSCH), more than one channel state information (CSI) report 236 may be transmitted on the physical uplink shared channel (PUSCH) in a subframe. The user equipment (UE) 104 may thus select a group of highest priority channel state information (CSI) reports 236 of the multiple channel state information (CSI) reports 236 using a prioritization scheme. The user equipment (UE) 104 may then transmit 406 the highest priority channel state information (CSI) report 236 (or reports). In one configuration, the user equipment (UE) 104 may transmit 406 the highest priority periodic channel state information (CSI) report 236a on the physical uplink control channel (PUCCH). One benefit of this method is that it allows a fair prioritization scheme where each component carrier (CC) 108 or cell 185 gets a fair share of the physical uplink control channel (PUCCH) to transmit uplink control information (UCI) 228.

Figure 5:
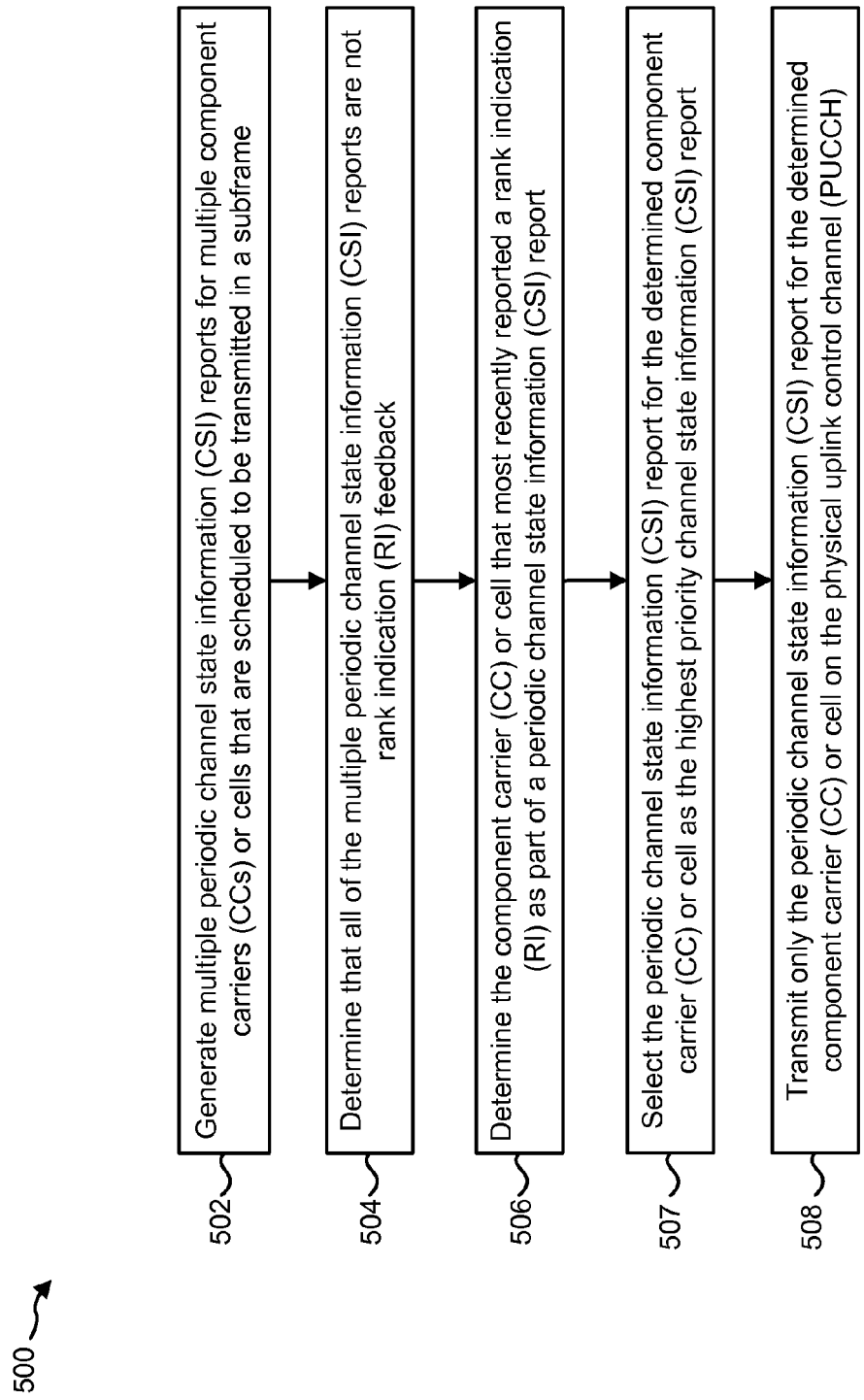
FIG. 5 is a flow diagram of a method for prioritizing channel state information (CSI) reports based on the rank indication (RI) that was most recently transmitted.

FIG. 5 is a flow diagram of a method 500 for prioritizing channel state information (CSI) reports 236 based on the rank indication (RI) 234 that was most recently transmitted. The method 500 may be performed by a user equipment (UE) 104. The user equipment (UE) 104 may generate 502 multiple periodic channel state information (CSI) reports 236a for multiple component carriers (CCs) 108 or cells 185 that are scheduled to be transmitted in a subframe. The user equipment (UE) 104 may determine 504 that all of the multiple periodic channel state information (CSI) reports 236a are not rank indication (RI) 234 feedback.

For periodic reporting, there are two types of channel quality indicator (CQI) feedback. Wideband feedback (WB-CQI) refers to feedback where the user equipment (UE) 104 reports one wideband channel quality indicator (CQI) 230 value for the whole system bandwidth. UE-selected subband feedback (UE-CQI) refers to feedback where the user equipment (UE) 104 reports the channel quality indicator (CQI) 230 for some subbands instead of for the whole system bandwidth. The system bandwidth may be divided into J bandwidth parts as illustrated in Table 1:

TABLE 1

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

The periodicity and frequency resolution used by a user equipment (UE) 104 to report channel state information (CSI) is configured by the eNode B 102. Usually, the period between two consecutive rank indication (RI) 234 reports is larger than the period between two channel quality indicator (CQI) 230 reports. Furthermore, the channel quality indicator (CQI) 230 values are calculated based on the rank indication (RI) 234 value. For instance, if the RI=1, the channel quality indicator (CQI) 230 of one codeword is reported. If the RI≥2, the channel quality indicator (CQI) 230 of two codewords is reported. Thus, the rank indication (RI) 234 is more important than the channel quality indicator (CQI) 230 and is protected more reliably. When a collision between rank indication (RI) 234 and CQI/PMI occurs, the CQI/PMI may be dropped and the rank indication (RI) 234 may be transmitted.

The user equipment (UE) 104 may determine 506 the component carrier (CC) 108 or cell 185 that most recently reported rank indication (RI) 234 as part of a periodic channel state information (CSI) report 236a. Alternatively, the user equipment (UE) 104 may determine the component carrier (CC) 108 or cell 185 that has not reported rank indication (RI) 234 for the longest period of time. The periodic channel state information (CSI) report 236a corresponding to the determined component carrier (CC) 108 or cell 185 may be selected 507 as the highest priority periodic channel state information (CSI) report 236a. The user equipment (UE) 104 may then transmit 508 only the periodic channel state information (CSI) report 236a for the determined component carrier (CC) 108 or cell 185 on the physical uplink control channel (PUCCH). Thus, in this prioritization scheme, the component carrier (CC) 108 or cell 185 that has most recently transmitted rank indication (RI) 234 is assumed to have the highest priority when a collision occurs.

Figure 6:
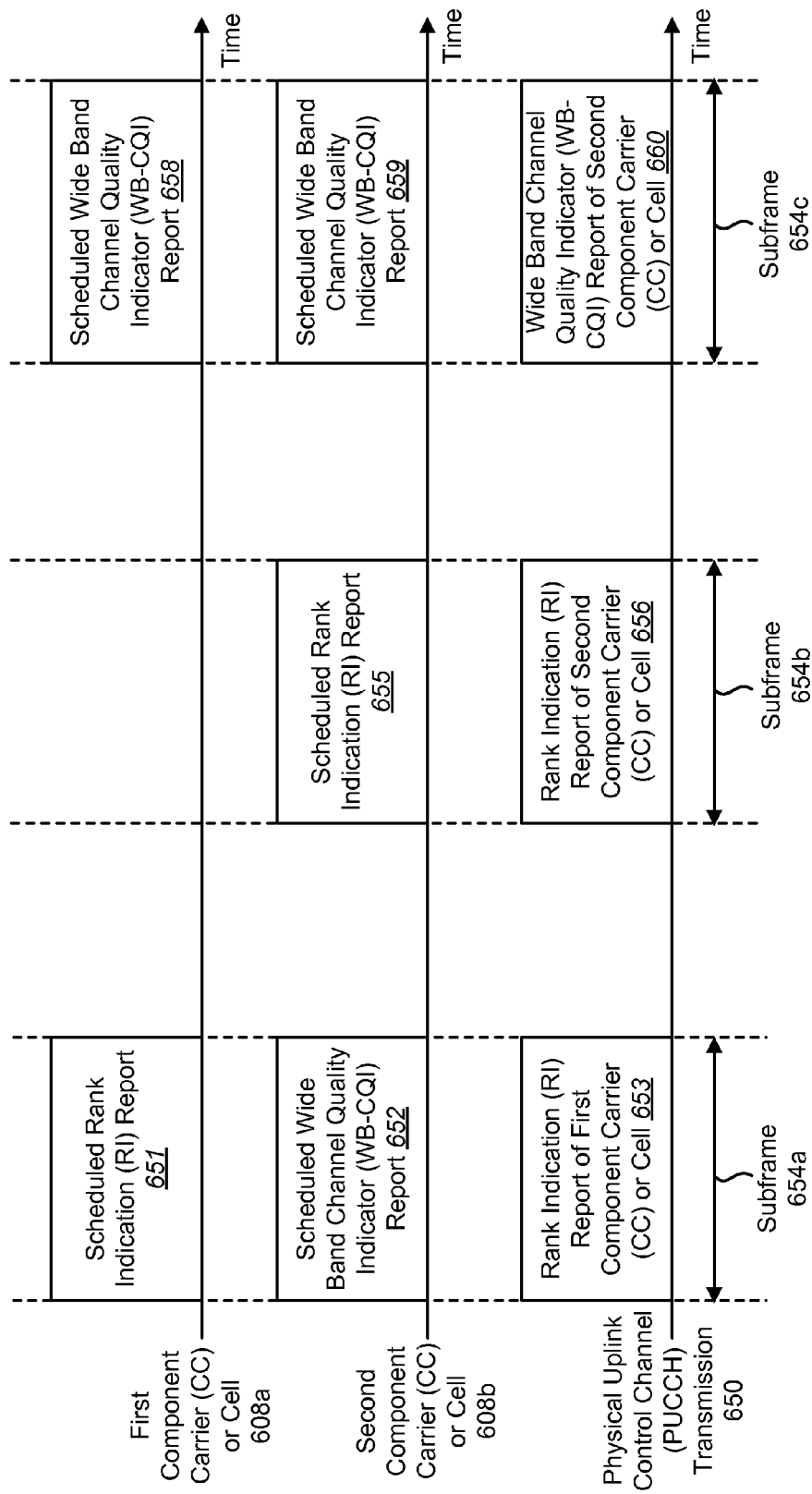
FIG. 6 is a timing diagram illustrating one example of prioritizing channel state information (CSI) reports based on the rank indication (RI) that was most recently transmitted.

FIG. 6 is a timing diagram illustrating one example of prioritizing channel state information (CSI) reports 236 based on the rank indication (RI) 234 that was most recently transmitted. For this example, only two component carriers (CCs) 608a-b or cells 185 are considered. However, the analysis can be extended to five component carriers (CCs) 608 or cells 185 in a straightforward manner. In a subframe 654a, a first component carrier (CC) 608a or cell 185 may have a scheduled rank indication (RI) report 651.

In the same subframe 654a, a second component carrier (CC) 608b or cell 185 may have a scheduled wide band channel quality indicator (WB-CQI) report 652. Thus, a collision is detected between the scheduled rank indication (RI) report 651 of the first component carrier (CC) 608a or cell 185 and the scheduled wide band channel quality indicator (WB-CQI) report 652 of the second component carrier (CC) 608b or cell 185. As discussed above, a rank indication (RI) 234 is considered to be more important than a channel quality indicator (CQI) 230. Therefore, the rank indication (RI) report 653 of the first component carrier (CC) 608a or cell 185 is included in the physical uplink control channel (PUCCH) transmission 650 for the subframe 654a and the scheduled wide band channel quality indicator (WB-CQI) report 652 for the second component carrier (CC) 608b or cell 185 is dropped.

In another subframe 654b, no periodic channel state information (CSI) report 236 is scheduled for the first component carrier (CC) 608a or cell 185 and the second component carrier (CC) 608b or cell 185 has a scheduled rank indication (RI) report 655. There is no collision in this subframe 654b and the rank indication (RI) report 656 of the second component carrier (CC) 608b or cell 185 is included in the physical uplink control channel (PUCCH) transmission 650. In yet another subframe 654c, the first component carrier (CC) 608a or cell 185 has a scheduled wide band channel quality indicator (WB-CQI) report 658 and the second component carrier (CC) 608b or cell 185 has a scheduled wide band channel quality indicator (WB-CQI) report 659. Thus, the scheduled wide band channel quality indicator (WB-CQI) 658 of the first component carrier (CC) 608a or cell 185 collides with the scheduled wide band channel quality indicator (WB-CQI) 659 of the second component carrier (CC) 608b or cell 185. Because the rank indication (RI) report 656 of the second component carrier (CC) 608b or cell 185 was reported later than the rank indication (RI) report 653 of the first component carrier (CC) 608a or cell 185, the prioritization method may select the scheduled wide band channel quality indicator (WB-CQI) 660 of the second component carrier (CC) 608b or cell 185 for the physical uplink control channel (PUCCH) transmission 650 in this subframe 654c.

Figure 7:
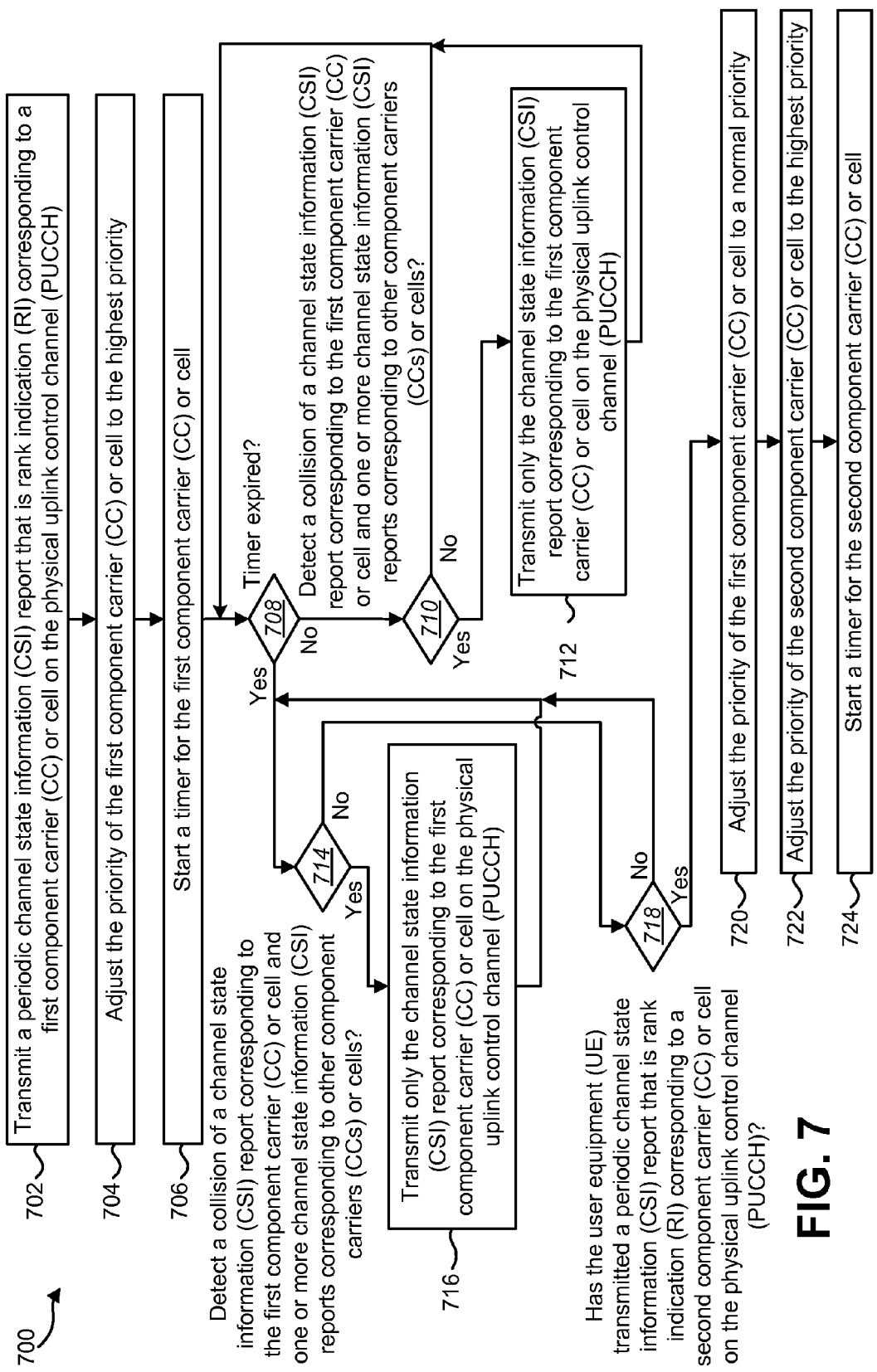
FIG. 7 is a flow diagram of a method for prioritizing channel state information (CSI) reports using a timer.

FIG. 7 is a flow diagram of a method 700 for prioritizing channel state information (CSI) reports 236 using a timer 216. The method 700 may be performed by a user equipment (UE) 104. The user equipment (UE) 104 may transmit 702 a periodic channel state information (CSI) report 236a that is rank indication (RI) 234 corresponding to a first component carrier (CC) 108 or cell 185 on the physical uplink control channel (PUCCH). The user equipment (UE) 104 may then adjust 704 the priority of the component carrier (CC) 108 or cell 185 to the highest priority. Adjusting 704 the priority of the component carrier (CC) 108 or cell 185 may thus adjust the priority 210 of each channel state information (CSI) report 236 corresponding to the component carrier (CC) 108 or cell 185. When a component carrier (CC) 108 or cell 185 has the highest priority, the feedback corresponding to the component carrier (CC) 108 or cell 185 may take priority over feedback corresponding to other component carriers (CCs) 108 or cells 185.

The user equipment (UE) 104 may then start 706 a timer 216. The timer 216 may be specific for each component carrier (CC) 108 or cell 185. Thus, a user equipment (UE) 104 may include a different timer 216 for each component carrier (CC) 108 or cell 185. The maximum value of each timer 216 may be preconfigured independently for each component carrier (CC) 108 or cell 185 or configured such that every component carrier (CC) 108 or cell 185 has the same maximum value. A timer 216 may expire after a certain number of subframes 654 (referred to as the Time Window (TW)). The Time Window (TW) of each timer 216 for each component carrier (CC) 108 or cell 185 may be configured by radio resource control (RRC) signaling.

In one configuration, more than one timer 216 may be running on the user equipment (UE) 104 at the same time. For example, a first timer 216 corresponding to a first component carrier (CC) 108 or cell 185 may start at time t=0 and expire after ten subframes 654. A second timer 216 corresponding to a second component carrier (CC) 108 or cell 185 may start at time t=1 and also expire after ten subframes 654. When multiple timers 216 are running for multiple component carriers (CCs) 108 or cells 185 at the same time and a channel state information (CSI) report 236 from each component carrier (CC) 108 or cell 185 collides, the component carrier (CC) 108 or cell 185 with the timer 216 that started first (i.e., the first component carrier (CC) 108 or cell 185) takes priority and the channel state information (CSI) report 236 of the first component carrier (CC) 108 or cell 185 is prioritized over the channel state information (CSI) report 236 of the second component carrier (CC) 108 or cell 185. If a component carrier (CC) 108 or cell 185 is deemed more important than other component carriers (CCs) 108 or cells 185, a higher value for the Time Window (TW) parameter of the timer 216 may be used.

The user equipment (UE) 104 may determine 708 if the timer 216 has expired. If the timer 216 has not expired, the user equipment (UE) 104 may determine 710 whether a collision of a channel state information (CSI) report 236 corresponding to the first component carrier (CC) 108 or cell 182 and one or more channel state information (CSI) reports 236 corresponding to other component carriers (CCs) 108 or cells 185 has been detected. If a collision has not been detected (e.g., only one channel state information (CSI) report 236 is generated for a particular subframe 654), the user equipment (UE) 104 may follow normal procedures (i.e., transmit the feedback on the physical uplink control channel (PUCCH)) and return to waiting for the timer 216 to expire. If a collision has been detected, the user equipment (UE) 104 may transmit 712 only the channel state information (CSI) report 236 corresponding to the first component carrier (CC) 108 or cell 185 on the physical uplink control channel (PUCCH). Thus, the user equipment (UE) 104 may drop the channel state information (CSI) report 236 or reports for other component carriers (CCs) 108 or cells 185. The user equipment (UE) 104 may then return to waiting for the timer 216 to expire.

If during the Time Window (TW), the channel state information (CSI) reports 236 of multiple component carriers (CCs) 108 or cells 185 (other than the first component carrier (CC) 108 or cell 185 that has the highest priority) collide, other forms of prioritization (such as those described in relation to FIG. 5 above and FIGS. 9, 11 and 12 below) may be applied. This is applicable only if there is one timer 216 running for all the component carriers (CCs) 108 or cells 185. If each component carrier (CC) 108 or cell 185 has its own timer, then the component carrier (CC) 108 or cell 185 with the largest value (or alternatively the smallest value) of time passed on the timer 216 may be selected.

If the timer 216 has expired, the first component carrier (CC) 108 or cell 185 may continue to have the highest priority until a rank indication (RI) 234 report from another component carrier (CC) 108 or cell 185 is transmitted. The user equipment (UE) 104 may determine 714 whether a collision of a channel state information (CSI) report 236 corresponding to the first component carrier (CC) 108 or cell 185 and one or more channel state information (CSI) reports 236 corresponding to other component carriers (CCs) 108 or cells 185 is detected for each subframe. If a collision of a channel state information (CSI) report 236 corresponding to the first component carrier (CC) 108 or cell 185 and one or more channel state information (CSI) reports 236 corresponding to other component carriers (CCs) 108 or cells 185 is detected for a subframe, the user equipment (UE) 104 may transmit 716 only the channel state information (CSI) report 236 corresponding to the first component carrier (CC) 108 or cell 185 on the physical uplink control channel (PUCCH). The user equipment (UE) 104 may then return to determining 714 whether a collision of a channel state information (CSI) report 236 corresponding to the first component carrier (CC) 108 or cell 185 and one or more channel state information (CSI) reports 236 corresponding to other component carriers (CCs) 108 or cells 185 is detected for each subframe.

If a collision of a channel state information (CSI) report 236 corresponding to the first component carrier (CC) 108 or cell 185 and one or more channel state information (CSI) reports 236 corresponding to other component carriers (CCs) 108 or cells 185 is not detected for a subframe, the user equipment (UE) 104 may determine 718 whether the user equipment (UE) 104 has transmitted a periodic channel state information (CSI) report 236a that is rank indication (RI) 234 corresponding to a second component carrier (CC) 108 or cell 185 on the physical uplink control channel (PUCCH). If the user equipment (UE) 104 has transmitted a periodic channel state information (CSI) report 236a that is rank indication (RI) 234 corresponding to a second component carrier (CC) 108 or cell 185 on the physical uplink control channel (PUCCH), the user equipment (UE) 104 may adjust 720 the priority of the first component carrier (CC) 108 or cell 185 to a normal priority (i.e., the original priority of the component carrier (CC) 108 or cell 185, since each component carrier (CC) 108 or cell 185 may have a different priority value). The user equipment (UE) 104 may then adjust 722 the priority of the second component carrier (CC) 108 or cell 185 to a highest priority. The user equipment (UE) 104 may also start 724 a timer 216 for the second component carrier (CC) 108 or cell 185.

If the user equipment (UE) 104 has not transmitted a periodic channel state information (CSI) report 236a that is rank indication (RI) 234 corresponding to a second component carrier (CC) 108 or cell 185 on the physical uplink control channel (PUCCH), the user equipment (UE) 104 may return to determining 714 whether a collision of a channel state information (CSI) report 236 corresponding to the first component carrier (CC) 108 or cell 185 and one or more channel state information (CSI) reports 236 corresponding to other component carriers (CCs) 108 or cells 185 is detected for each subframe.

One benefit of this method 700 is that it allows the channel quality indicator (CQI) 230 report of a component carrier (CC) 108 or cell 185 to be transmitted on the physical uplink control channel (PUCCH) instead of always dropping the channel quality indicator (CQI) 230 report in cases where the channel quality indicator (CQI) 230 report collides with a rank indication (RI) 234 report. The channel quality indicator (CQI) 230 calculation may be dependent on the rank indication (RI) 234 report value and helps the eNode B 102 select the transmission and coding rate for the downlink transmission. Hence, the prioritization scheme allows for a more flexible and dynamic prioritization compared to the semi-static schemes (e.g., prioritizing using only radio resource control (RRC) signaling to preference one component carrier (CC) 108 or cell 185 over another).

Figure 8:
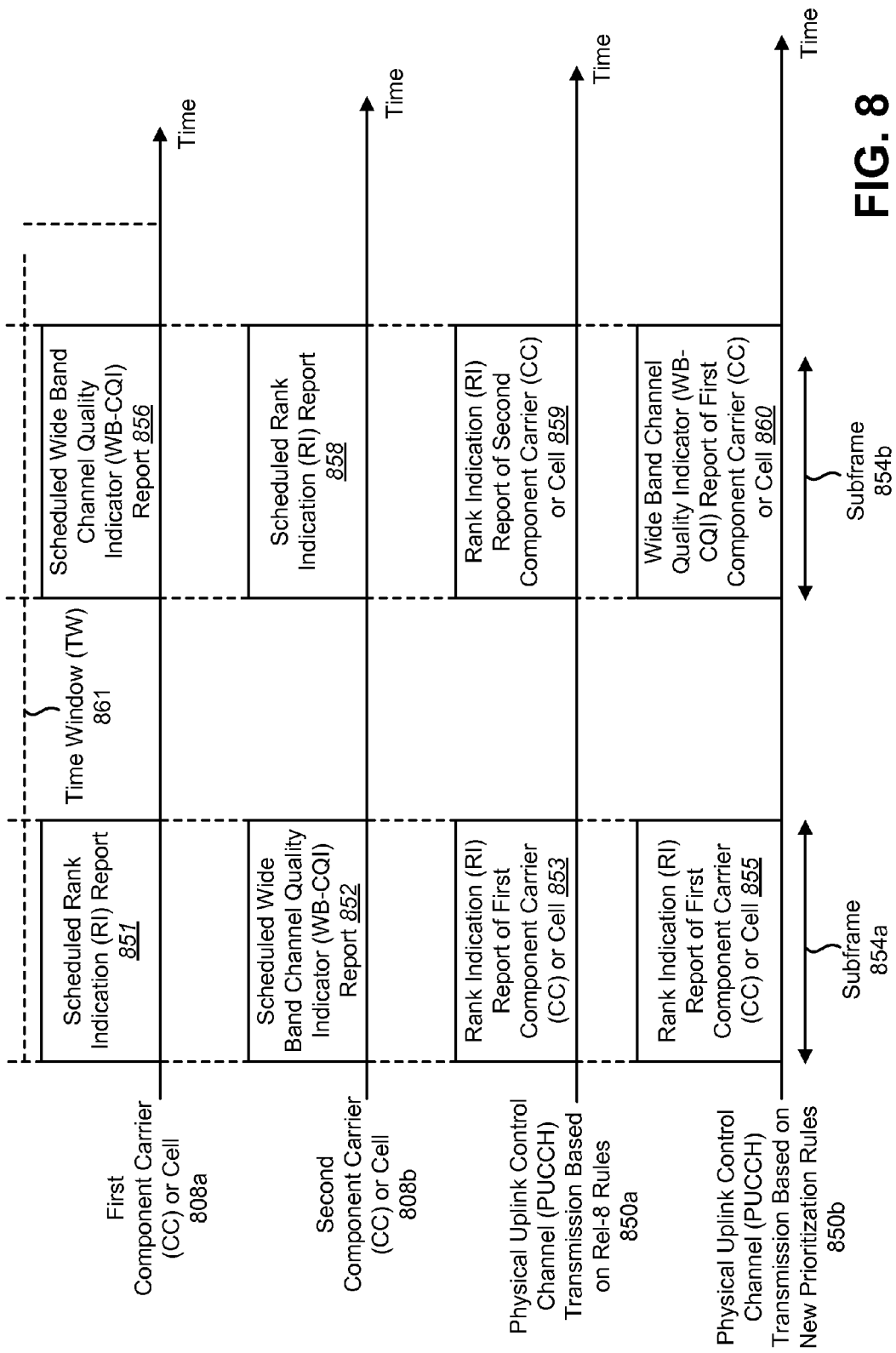
FIG. 8 is a timing diagram illustrating one example of prioritizing channel state information (CSI) reports using a timer.

FIG. 8 is a timing diagram illustrating one example of prioritizing channel state information (CSI) reports 236 using a timer 116. In this example only two component carriers (CCs) 808a-b or cells 185 are considered. However, the analysis can be extended to five component carriers (CCs) 808 or cells 185 in a straightforward manner. In a subframe 854a, a first component carrier (CC) 808a or cell 185 may have a scheduled rank indication (RI) report 851. In the same subframe 854a, a second component carrier (CC) 808b or cell 185 may have a scheduled wide band channel quality indicator (WB-CQI) report 852. The physical uplink control channel (PUCCH) transmission 850a (based on Rel-8 rules) of the subframe 854a includes the rank indication (RI) report 853 of the first component carrier (CC) 808a or cell 185 because a rank indication (RI) 234 report is considered to have a higher priority than a channel quality indicator (CQI) 230 report. The physical uplink control channel (PUCCH) transmission 850b (based on the new prioritization rules) of the subframe 854a also includes the rank indication (RI) report 855 of the first component carrier (CC) 808a or cell 185 because a rank indication (RI) 234 report is considered to have a higher priority than a channel quality indicator (CQI) 230 report.

In the new prioritization rules, because the rank indication (RI) report 855 of the first component carrier (CC) 808a or cell 185 is transmitted on the physical uplink control channel (PUCCH) 850b, the first component carrier (CC) 808a or cell 185 starts a timer 116 with a duration of Time Window (TW) 861. Within the Time Window (TW) 861, channel state information (CSI) reports 236 of the first component carrier (CC) 808a or cell 185 have a higher priority than channel state information (CSI) reports 236 of the second component carrier (CC) 808b or cell 185. In another subframe 854b that is within the Time Window (TW) 861, the first component carrier (CC) 808a or cell 185 may have a scheduled wide band channel quality indicator (WB-CQI) report 856 and the second component carrier (CC) 808b or cell 185 may have a scheduled rank indication (RI) report 858. The physical uplink control channel (PUCCH) transmission 850a (based on Rel-8 rules) of the subframe 854b may include the rank indication (RI) report 859 of the second component carrier (CC) 808b or cell 185 because a rank indication (RI) 234 report is considered to have a higher priority than a channel quality indicator (CQI) 230 report. However, the physical uplink control channel (PUCCH) transmission 850b (based on the new prioritization rules) of the subframe 854b may include the wide band channel quality indicator (WB-CQI) report 860 of the first component carrier (CC) 808a or cell 185 because the first component carrier (CC) 808a or cell 185 has a higher priority during the Time Window (TW) 861.

Figure 9:
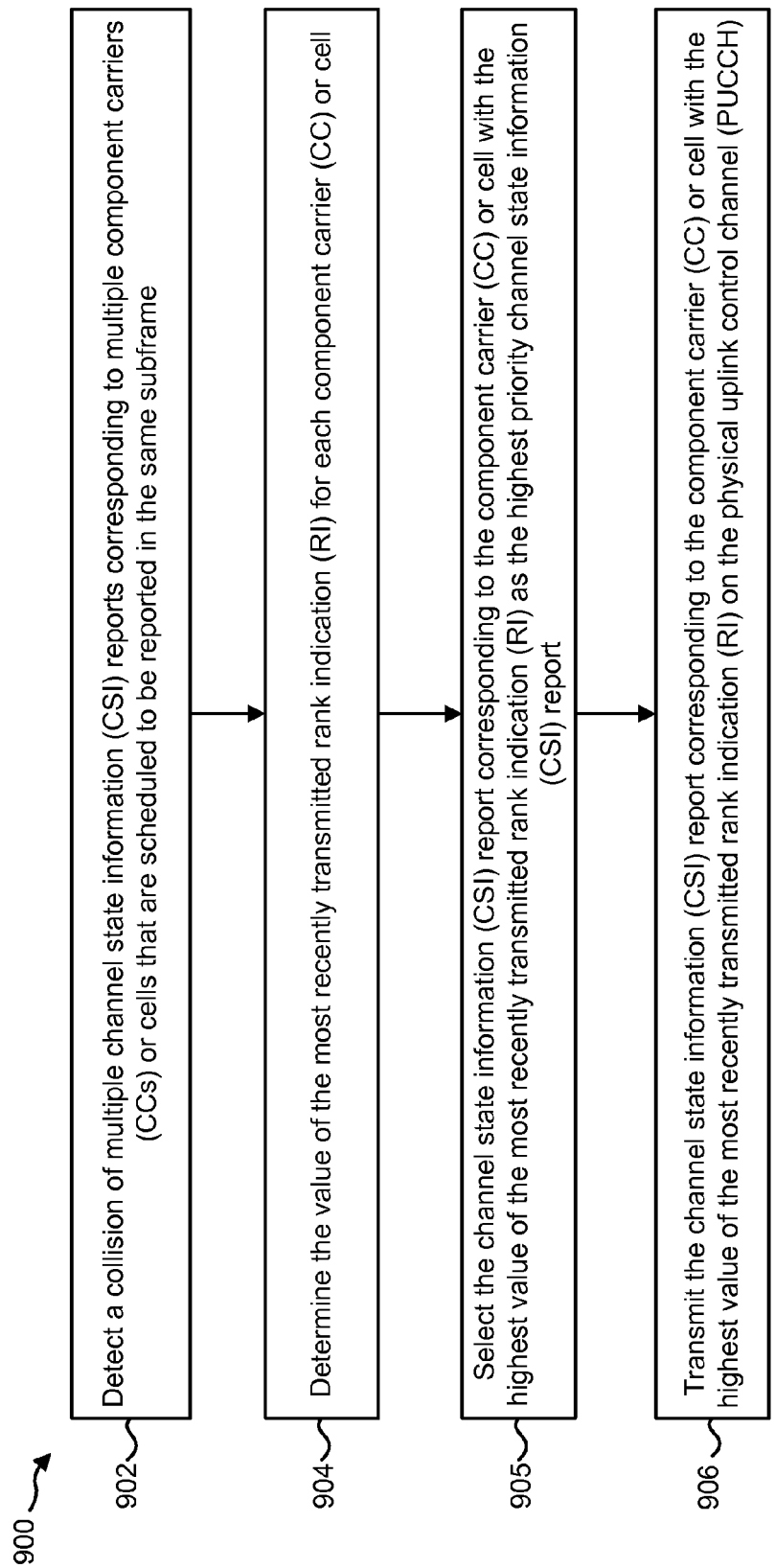
FIG. 9 is a flow diagram of a method for prioritizing channel state information (CSI) reports of a component carrier (CC) or cell based on the value of the most recently transmitted rank indication (RI) report.

FIG. 9 is a flow diagram of a method 900 for prioritizing channel state information (CSI) reports 236 of a component carrier (CC) 108 or cell 185 based on the value of the most recently transmitted rank indication (RI) 234 report. The method 900 uses the value of a rank indication (RI) 234 report rather than the periodicity of a rank indication (RI) 234 report to decide which component carrier (CC) 108 or cell 185 should have the highest priority. The method 900 may be performed by a user equipment (UE) 104. The user equipment (UE) 104 may detect 902 a collision of multiple channel state information (CSI) reports 236 corresponding to multiple component carriers (CCs) 108 or cells 185 that are scheduled to be reported in the same subframe 654. The user equipment (UE) 104 may determine 904 the value of the most recently transmitted rank indication (RI) 234 for each component carrier (CC) 108 or cell 185. Alternatively, the user equipment (UE) 104 may determine the value of the reported rank indication (RI) 234 for each component carrier (CC) 108 or cell 185 that has not transmitted a rank indication (RI) 234 report for the longest period of time.

The user equipment (UE) 104 may select 905 the channel state information (CSI) report 236 corresponding to the component carrier (CC) 108 or cell 185 with the highest value of the most recently transmitted rank indication (RI) 234 as the highest priority channel state information (CSI) report 236. The user equipment (UE) 104 may then transmit 906 the channel state information (CSI) report 236 corresponding to the component carrier (CC) 108 or cell 185 with the highest value of the most recently transmitted rank indication (RI) 234 on the physical uplink control channel (PUCCH). This allows the user equipment (UE) 104 to prioritize the feedback corresponding to multiple-input and multiple-output (MIMO) transmissions over the feedback corresponding to single-antenna transmissions. The user equipment (UE) 104 may drop the other channel state information (CSI) reports 236 that were part of the collision.

Alternatively, the user equipment (UE) 104 may transmit the channel state information (CSI) report 236 corresponding to the component carrier (CC) 108 or cell 185 with the lowest value of the most recently transmitted rank indication (RI) 234 on the physical uplink control channel (PUCCH). This allows the user equipment (UE) 104 to prioritize the feedback of single-antenna transmissions over the feedback of multiple-input and multiple-output (MIMO) transmissions. If flexibility is required, both forms of prioritization may be standardized by using some form of signaling (e.g., radio resource control (RRC) signaling) to select the preferred method of prioritization. The benefit of this form of prioritization is that it allows for prioritization based on the transmission mode (e.g., single-antenna transmission or multiple-antenna transmission).

Figure 10:
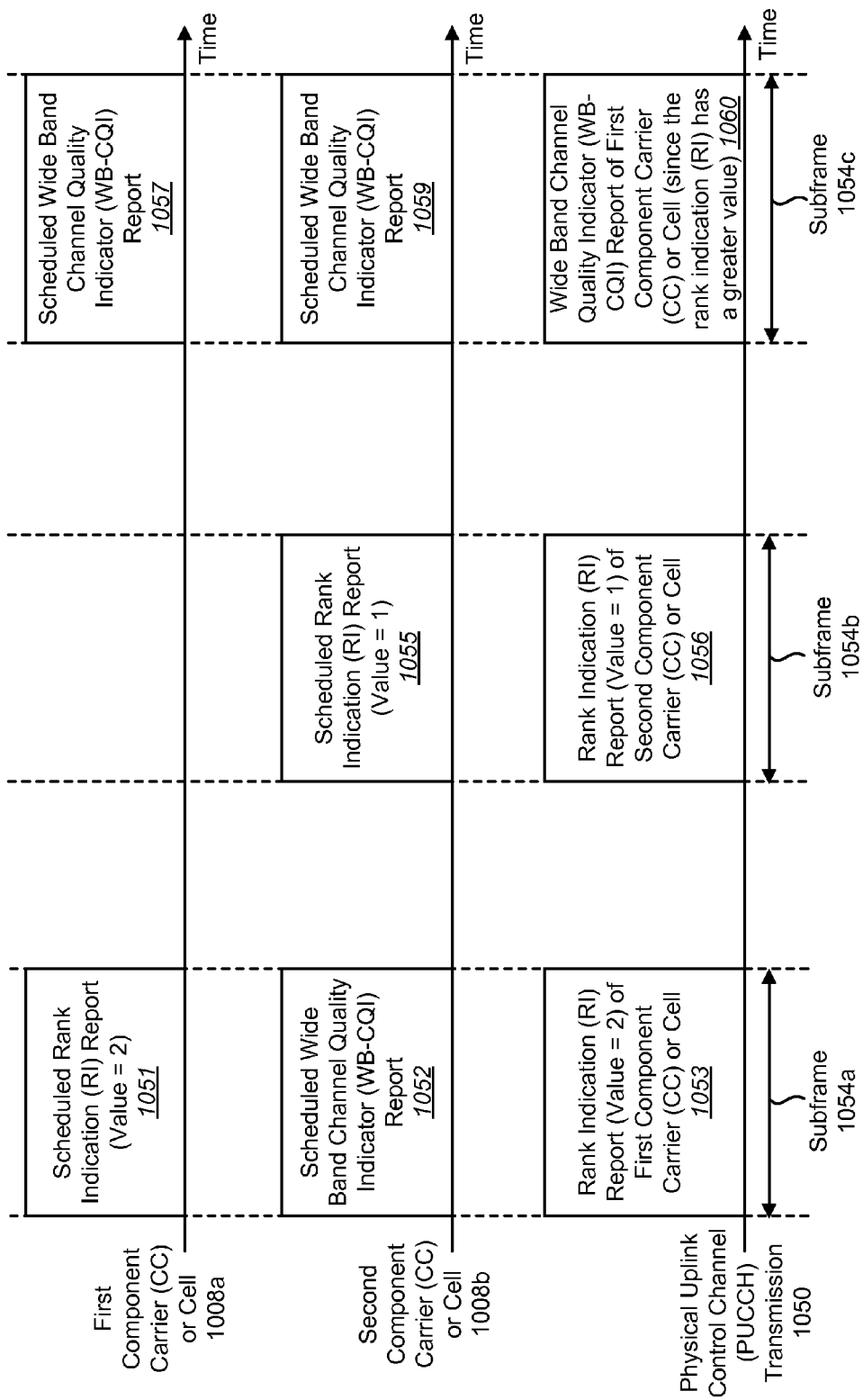
FIG. 10 is a timing diagram illustrating one example of prioritizing channel state information (CSI) reports based on the highest value of the most recently transmitted rank indication (RI) report.

FIG. 10 is a timing diagram illustrating one example of prioritizing channel state information (CSI) reports 236 based on the highest value of the most recently transmitted rank indication (RI) 234 report. For this example, only two component carriers (CCs) 1008a-b or cells 185 are considered. However, the analysis can be extended to five component carriers (CCs) 1008 or cells 185 in a straightforward manner. In a subframe 1054a, a first component carrier (CC) 1008a or cell 185 may have a scheduled rank indication (RI) report 1051 with a value of 2. In the same subframe 1054a, a second component carrier (CC) 1008b or cell 185 may have a scheduled wide band channel quality indicator (WB-CQI) report 1052. Thus, a collision is detected between the scheduled rank indication (RI) report 1051 of the first component carrier (CC) 1008a or cell 185 and the scheduled wide band channel quality indicator (WB-CQI) report 1052 of the second component carrier (CC) 1008b or cell 185. As discussed above, rank indication (RI) 234 is considered to have a higher priority than a channel quality indicator (CQI) 230. Therefore, the physical uplink control channel (PUCCH) transmission 1050 for the subframe 1054 includes the rank indication (RI) report 1053 of the first component carrier (CC) 1008a or cell 185 with a value of 2.

In another subframe 1054b, the first component carrier (CC) 1008a or cell 185 may not have a scheduled channel state information (CSI) report 236. In the same subframe 1054b, the second component carrier (CC) 1008b or cell 185 may have a scheduled rank indication (RI) report 1055 with a value of 1. No collision is detected and the physical uplink control channel (PUCCH) transmission 1050 of the subframe 1054b includes the rank indication (RI) report 1056 of the second component carrier (CC) 1008b or cell 185 with a value of 1.

In yet another subframe 1054b, the first component carrier (CC) 1008a or cell 185 has a scheduled wide band channel quality indicator (WB-CQI) report 1057 and the second component carrier (CC) 1008b or cell 185 has a scheduled wide band channel quality indicator (WB-CQI) report 1059. Thus, a collision is detected between the scheduled wide band channel quality indicator (WB-CQI) report 1057 of the first component carrier (CC) 1008a or cell 185 and the scheduled wide band channel quality indicator (WB-CQI) report 1059 of the second component carrier (CC) 1008b or cell 185. The user equipment (UE) 104 may determine that the most recent transmitted rank indication (RI) 1053 for the first component carrier (CC) 1008a or cell 185 has a value of 2 and that the most recent transmitted rank indication (RI) 1056 for the second component carrier (CC) 1008b or cell 185 has a value of 1. Thus, because the most recent transmitted rank indication (RI) 1053 for the first component carrier (CC) 1008a or cell 185 has a greater value than the most recent transmitted rank indication (RI) 1056 for the second component carrier (CC) 1008b or cell 185, the physical uplink control channel (PUCCH) transmission 1050 for the subframe 1054c may include the wide band channel quality indicator (WB-CQI) report 1060 of the first component carrier (CC) 1008a or cell 185.

Figure 11:
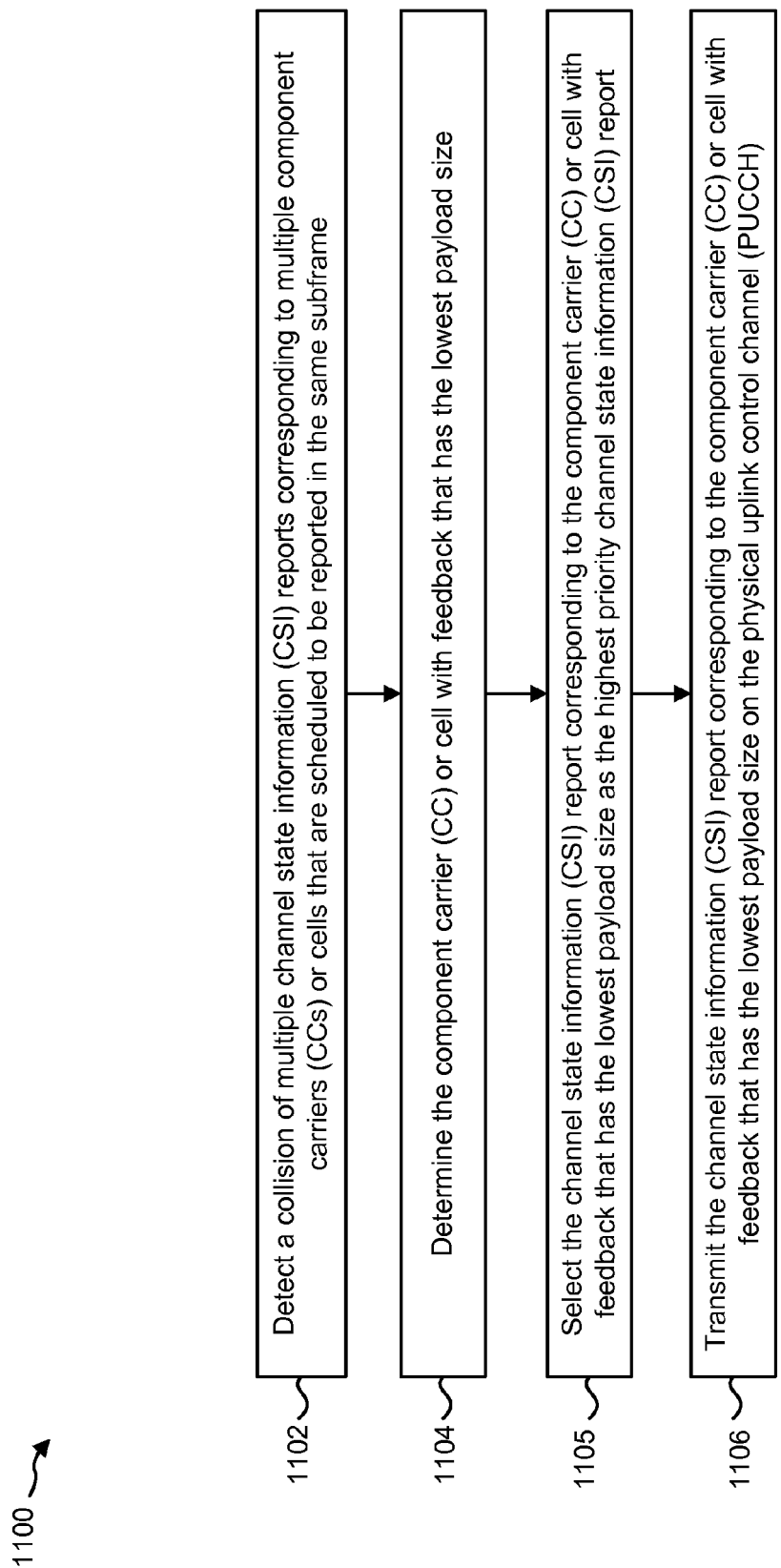
FIG. 11 is a flow diagram of a method for prioritizing channel state information (CSI) reports based on the payload size of the channel state information (CSI) reports.

FIG. 11 is a flow diagram of a method 1100 for prioritizing channel state information (CSI) reports 236 based on the payload size of the channel state information (CSI) reports 236. The method 1100 may be performed by a user equipment (UE) 104. The user equipment (UE) 104 may detect 1102 a collision of multiple channel state information (CSI) reports 236 corresponding to multiple component carriers (CCs) 108 or cells 185 that are scheduled to be reported in the same subframe 654. The user equipment (UE) 104 may then determine 1104 the component carrier (CC) 108 or cell 185 with feedback that has the lowest payload size. Different types of periodic feedback information may have different payload sizes. For example, a wideband channel quality indicator (WB-CQI) report may have a payload size of four bits for one codeword and a rank indication (RI) 234 report may have two bits of payload for four layer spatial multiplexing in Rel-8. The user equipment (UE) 104 may select 1105 the channel state information (CSI) report 236 corresponding to the component carrier (CC) 108 or cell 185 with feedback that has the lowest payload size as the highest priority channel state information (CSI) report 236.

The user equipment (UE) 104 may transmit 1106 the channel state information (CSI) report 236 corresponding to the component carrier (CC) 108 or cell 185 with feedback that has the lowest payload size on the physical uplink control channel (PUCCH). Alternatively, the user equipment (UE) 104 may transmit the channel state information (CSI) report 236 corresponding to the component carrier (CC) 108 or cell 185 with feedback that has the highest payload size on the physical uplink control channel (PUCCH). The benefit of this type of prioritization is that feedback may be prioritized based on the content. For example, higher reliable content may be prioritized over lower reliable content or feedback with more information may be prioritized over feedback with less information.

Figure 12:
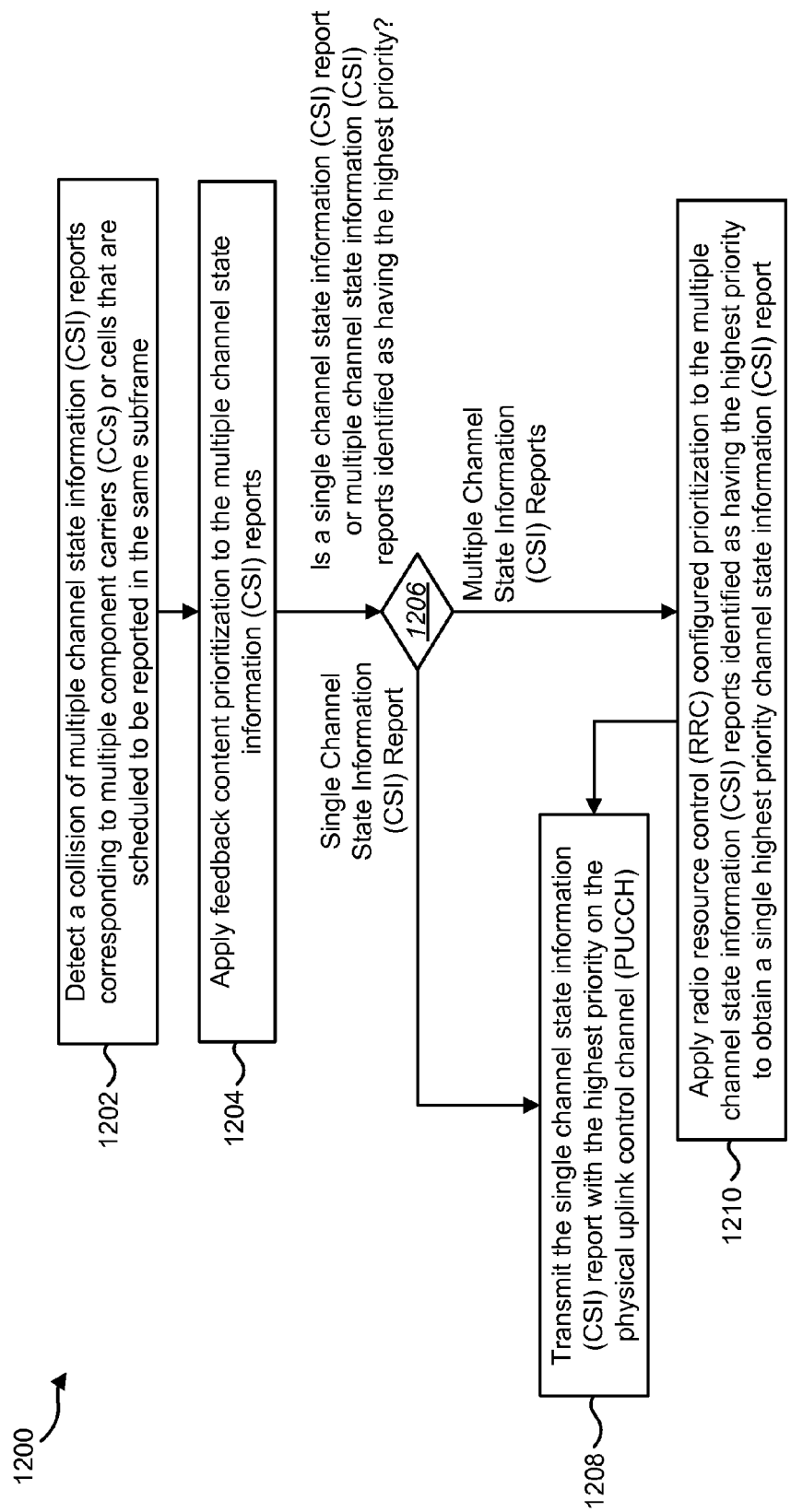
FIG. 12 is a method for prioritizing a channel state information (CSI) report using both radio resource control (RRC) prioritization and feedback content prioritization.

FIG. 12 is a method 1200 for prioritizing a channel state information (CSI) report 236 using both radio resource control (RRC) prioritization and feedback content prioritization. The method 1200 may be performed by a user equipment (UE) 104. It has been proposed to use radio resource control (RRC) configurations for prioritizing the component carrier (CC) 108 or cell 185 order. For example, if a first component carrier (CC) 108 or cell 185 is prioritized over a second component carrier (CC) 108 or cell 185 using radio resource control (RRC) signaling, then when the channel quality indicator (CQI) 230 of the first component carrier (CC) 108 or cell 185 collides with the rank indication (RI) 234 of the second component carrier (CC) 108 or cell 185, the rank indication (RI) 234 of the second component carrier (CC) 108 or cell 185 is dropped. This is contrary to the rules of Rel-8, where the channel quality indicator (CQI) 230 is always dropped when it collides with a rank indication (RI) 234 report. It has also been proposed that content order be prioritized similar to the prioritization methods used in Rel-8 (i.e., when a rank indication (RI) 234 report collides with a channel quality indicator (CQI) 230, the rank indication (RI) 234 report is always transmitted). Both of these prioritization methods have benefits. A user equipment (UE) 104 may use a radio resource control (RRC) parameter (e.g., priority_mode_config) to select which prioritization method to use (i.e., to configure whether prioritization of a channel state information (CSI) report 236 is based on component carrier (CC) 108 or cell ordering or based on content ordering).

In one mode, the user equipment (UE) 104 may first prioritize using either an explicitly radio resource control (RRC) signaled configuration (e.g., one such component carrier (CC) 108 or cell 185 order can be in simple ascending order 1, 2, 3, 4 and 5, where 1 is the highest priority component carrier (CC) 108 or cell 185) or implicitly derived from radio resource control (RRC) signaling (e.g., selecting the component carrier (CC) 108 or cell 185 with the largest periodicity where the periodicity is configured by radio resource control (RRC) signaling). The user equipment (UE) 104 may then choose content based prioritization using the Rel-8 rules (e.g., rank indication (RI) 234 is prioritized over a channel quality indicator (CQI) 230). In another mode, content based prioritization is done first. If after the content based prioritization, there is the same type of feedback to be reported from more than one component carrier (CC) 108 or cell 185, the explicitly radio resource control (RRC) signaled configuration may be used. Hence, there should be a radio resource control (RRC) configuration to select whether the first mode or the second mode is used.

The user equipment (UE) 104 may detect 1202 a collision of multiple channel state information (CSI) reports 236 corresponding to multiple component carriers (CCs) 108 or cells 185 that are scheduled to be reported in the same subframe 654. The user equipment (UE) 104 may then apply 1204 feedback content prioritization (i.e., one or more of the methods discussed above in relation to FIGS. 5, 7, 9 and 11) to the multiple channel state information (CSI) reports 236. The feedback content is thus prioritized based on different criteria (e.g., rank indication (RI) 234 has higher priority compared to CQI/PMI, wideband CQI/PMI has higher priority compared to sub-band CQI 230, original information has higher priority compared to differential information, longer period feedback has higher priority compared to shorter period feedback and the first codeword has higher priority compared to later codewords).

The user equipment (UE) 104 may next determine 1206 whether a single channel state information (CSI) report 236 or multiple channel state information (CSI) reports 236 are identified as having the highest priority. If only a single channel state information (CSI) report 236 is identified as having the highest priority, the user equipment (UE) 104 may transmit 1208 the single channel state information (CSI) report 236 with the highest priority on the physical uplink control channel (PUCCH). If multiple channel state information (CSI) reports 236 are identified as having the highest priority, the user equipment (UE) 104 may apply 1210 radio resource control (RRC) configured prioritization to the multiple channel state information (CSI) reports 236 identified as having the highest priority. In radio resource control (RRC) configured prioritization, the rank indication (RI) 234 of a primary component carrier (PCC) 108a is prioritized over the rank indication (RI) 234 of a secondary component carrier (SCC) 108b. If there are multiple rank indication (RI) 234 reports from more than one secondary component carrier (SCC) 108b (not including the primary component carrier (PCC) 108a) with identical periodicity, the rank indication (RI) 234 of the higher priority secondary component carrier (SCC) 108b as configured by radio resource control (RRC) signaling may be selected for the channel state information (CSI) report 236 reported on the physical uplink control channel (PUCCH). The user equipment (UE) 104 may then transmit 1208 the single channel state information (CSI) report 236 with the highest priority on the physical uplink control channel (PUCCH).

Figure 13:
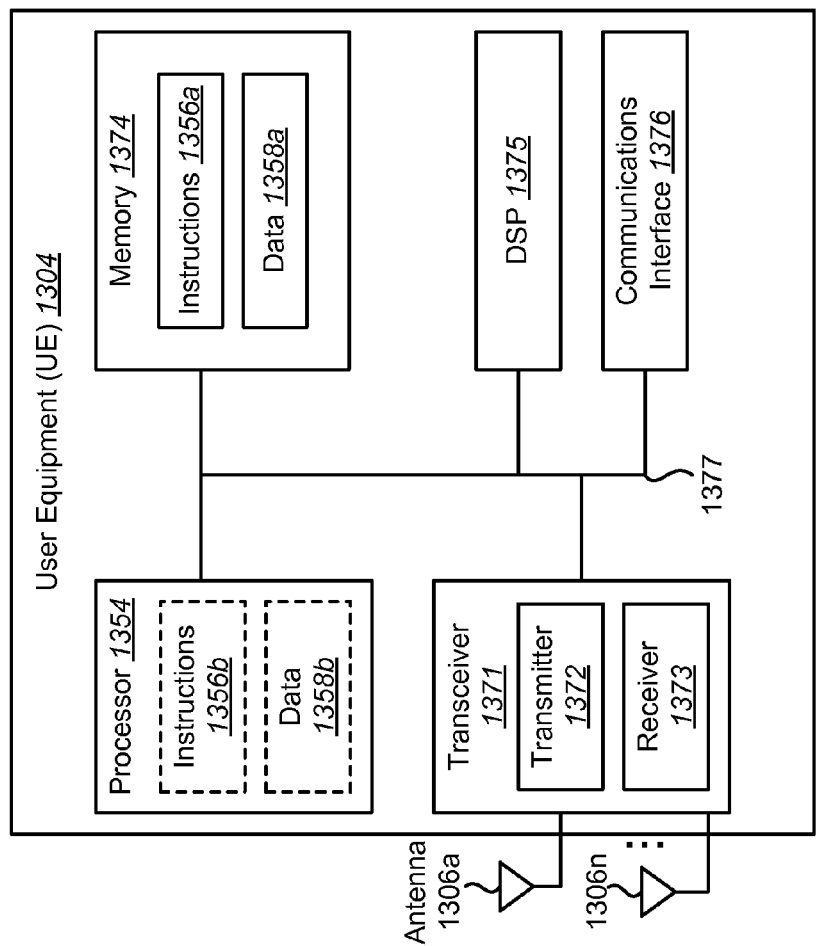
FIG. 13 illustrates various components that may be utilized in a user equipment (UE)

FIG. 13 illustrates various components that may be utilized in a user equipment (UE) 1304. The user equipment (UE) 1304 may be utilized as the user equipment (UE) 104 illustrated previously. The user equipment (UE) 1304 includes a processor 1354 that controls operation of the user equipment (UE) 1304. The processor 1354 may also be referred to as a CPU. Memory 1374, which may include both read-only memory (ROM), random access memory (RAM) or any type of device that may store information, provides instructions 1356a and data 1358a to the processor 1354. A portion of the memory 1374 may also include non-volatile random access memory (NVRAM). Instructions 1356b and data 1358b may also reside in the processor 1354. Instructions 1356b and/or data 1358b loaded into the processor 1354 may also include instructions 1356a and/or data 1358a from memory 1374 that were loaded for execution or processing by the processor 1354. The instructions 1356b may be executed by the processor 1354 to implement the systems and methods disclosed herein.

The user equipment (UE) 1304 may also include a housing that contains a transmitter 1372 and a receiver 1373 to allow transmission and reception of data. The transmitter 1372 and receiver 1373 may be combined into a transceiver 1371. One or more antennas 1306a-n are attached to the housing and electrically coupled to the transceiver 1371.

The various components of the user equipment (UE) 1304 are coupled together by a bus system 1377, which may include a power bus, a control signal bus, and a status signal bus, in addition to a data bus. However, for the sake of clarity, the various buses are illustrated in FIG. 13 as the bus system 1377. The user equipment (UE) 1304 may also include a digital signal processor (DSP) 1375 for use in processing signals. The user equipment (UE) 1304 may also include a communications interface 1376 that provides user access to the functions of the user equipment (UE) 1304. The user equipment (UE) 1304 illustrated in FIG. 13 is a functional block diagram rather than a listing of specific components.

Figure 14:
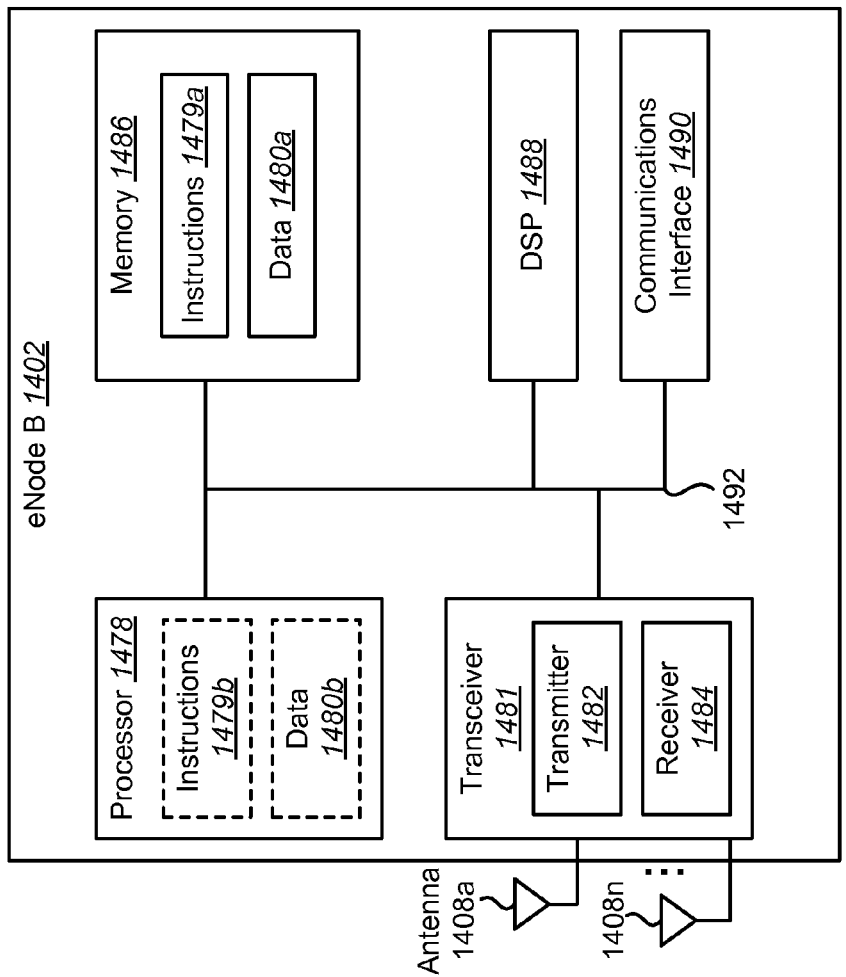
FIG. 14 illustrates various components that may be utilized in an eNode B.

FIG. 14 illustrates various components that may be utilized in an eNode B 1402. The eNode B 1402 may be utilized as the eNode B 102 illustrated previously. The eNode B 1402 may include components that are similar to the components discussed above in relation to the user equipment (UE) 1304, including a processor 1478, memory 1486 that provides instructions 1479a and data 1480a to the processor 1478, instructions 1479b and data 1480b that may reside in or be loaded into the processor 1478, a housing that contains a transmitter 1482 and a receiver 1484 (which may be combined into a transceiver 1481), one or more antennas 1408a-n electrically coupled to the transceiver 1481, a bus system 1492, a DSP 1488 for use in processing signals, a communications interface 1490 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reporting uplink control information (UCI) on a user equipment (UE), comprising:
   detecting a collision of a second periodic channel state information (CSI) report corresponding to a first cell and a third periodic CSI report corresponding to a second cell, wherein the second periodic CSI report and the third periodic CSI report are scheduled to be reported in a same first subframe, wherein a first periodic CSI report corresponding to the first cell is transmitted in an earlier subframe than the first subframe;
   determining one periodic CSI report to be transmitted among the second and third periodic CSI reports in the first subframe,
   wherein in a case where the first periodic CSI report that corresponds to the first cell and that includes a rank indication (RI) has been transmitted in the earlier subframe, a priority of a second periodic CSI report that corresponds to the first cell and that is to be transmitted in the first subframe varies according to a value of the first periodic CSI report that includes the RI; and
   transmitting the periodic CSI report of a highest priority cell.

2. The method of claim 1, wherein determining a periodic CSI report of a highest priority cell is further based on a radio resource control (RRC) configuration if the collision is still not resolved.

3. The method of claim 1, wherein the second periodic CSI report has (i) a highest priority in a case where the value of the first periodic CSI report is a particular value and (ii) a priority lower than the highest priority in a case where the value of the first periodic CSI report is a value other than the particular value.

4. A user equipment (UE) configured for reporting uplink control information (UCI), comprising:
   a processor;
   memory in electronic communication with the processor;
   instructions stored in the memory, the instructions being executable to:
      detect a collision of a second periodic channel state information (CSI) report corresponding to a first cell and a third periodic CSI report corresponding to a second cell, wherein the second periodic CSI report and the third periodic CSI report are scheduled to be reported in a same first subframe, wherein a first periodic CSI report corresponding to the first cell is transmitted in an earlier subframe than the first subframe;
      determine one periodic CSI report to be transmitted among the second and third periodic CSI reports in the first subframe,
      wherein in a case where the first periodic CSI report that corresponds to the first cell and that includes a rank indication (RI) has been transmitted in the earlier subframe, a priority of a second periodic CSI report that corresponds to the first cell and that is to be transmitted in the first subframe varies according to a value of the first periodic CSI report that includes the RI; and
      transmit the periodic CSI report of a highest priority cell.

5. The user equipment (UE) of claim 4, wherein the instructions executable to determine a periodic CSI report of a highest priority cell are further based on a radio resource control (RRC) configuration if the collision is still not resolved.

6. An integrated circuit causing a user equipment (UE) to have a plurality of functions by being mounted in the UE which is configured for reporting uplink control information (UCI), the integrated circuit comprising:
   memory;
   instructions stored in the memory, the instructions being executable by the integrated circuit to cause the UE to have the functions of:
      detecting a collision of a second periodic channel state information (CSI) report corresponding to a first cell and a third periodic CSI report corresponding to a second cell, wherein the second periodic CSI report and the third periodic CSI report are scheduled to be reported in a same first subframe, wherein a first periodic CSI report corresponding to the first cell is transmitted in an earlier subframe than the first subframe;
      determining one periodic CSI report to be transmitted among the second and third periodic CSI reports in the first subframe,
      wherein in a case where the first periodic CSI report that corresponds to the first cell and that includes a rank indication (RI) has been transmitted in the earlier subframe, a priority of a second periodic CSI report that corresponds to the first cell and that is to be transmitted in the first subframe varies according to a value of the first periodic CSI report that includes the RI; and
      transmitting the periodic CSI report of a highest priority cell.

7. A method for receiving uplink control information (UCI) on a base station, comprising:
   detecting a collision of a second periodic channel state information (CSI) report corresponding to a first cell and a third periodic CSI report corresponding to a second cell, wherein the second periodic CSI report and the third periodic CSI report are scheduled to be reported in a same first subframe, wherein a first periodic CSI report corresponding to the first cell is transmitted in an earlier subframe than the first subframe;
   determining one periodic CSI report to be transmitted among the second and third in the first subframe,
   wherein in a case where the first periodic CSI report that corresponds to the first cell and that includes a rank indication (RI) has been transmitted in the earlier subframe, a priority of a second periodic CSI report that corresponds to the first cell and that is to be transmitted in the first subframe varies according to a value of the first periodic CSI report that includes the RI; and
   receiving the periodic CSI report of a highest priority cell.

8. A base station configured for receiving uplink control information (UCI) on a base station, comprising:
   a processor;
   memory in electronic communication with the processor;
   instructions stored in the memory, the instructions being executable to:
      detect a collision of a second periodic channel state information (CSI) report corresponding to a first cell and a third periodic CSI report corresponding to a second cell, wherein the second periodic CSI report and the third periodic CSI report are scheduled to be reported in a same first subframe, wherein a first periodic CSI report corresponding to the first cell is transmitted in an earlier subframe than the first subframe;

determine one periodic CSI report to be transmitted among the second and third periodic CSI reports in the first subframe, wherein in a case where the first periodic CSI report that corresponds to the first cell and that includes a rank indication (RI) has been transmitted in the earlier subframe, a priority of a second periodic CSI report that corresponds to the first cell and that is to be transmitted in the first subframe varies according to a value of the first periodic CSI report that includes the RI; and receive the periodic CSI report of a highest priority cell.

* * * * *